United States Patent
Wu et al.

(10) Patent No.: US 8,270,723 B2
(45) Date of Patent: Sep. 18, 2012

(54) RECOGNITION DEVICE, RECOGNITION METHOD, AND PROGRAM

(75) Inventors: Jianing Wu, Tokyo (JP); Yoshiaki Iwai, Tokyo (JP); Shunichi Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 13/046,184

(22) Filed: Mar. 11, 2011

(65) Prior Publication Data

US 2011/0249899 A1  Oct. 13, 2011

(30) Foreign Application Priority Data

Apr. 7, 2010 (JP) ................. 2010-088461

(51) Int. Cl.
  *G06K 9/46* (2006.01)
  *G10L 15/00* (2006.01)
(52) U.S. Cl. ........................ 382/190; 704/231
(58) Field of Classification Search ............. 382/159, 382/165, 169, 170, 181, 190, 219, 220, 225; 704/231, 239, 245, 251; 706/20; 707/737; 725/19

See application file for complete search history.

(56) References Cited

U.S. PATENT DOCUMENTS

| | | | | |
|---|---|---|---|---|
| 6,061,652 A | * | 5/2000 | Tsuboka et al. | 704/245 |
| 8,160,366 B2 | * | 4/2012 | Nakamura et al. | 382/190 |
| 8,170,379 B2 | * | 5/2012 | Shiiyama et al. | 382/305 |
| 2008/0072012 A1 | | 3/2008 | Kim | |

FOREIGN PATENT DOCUMENTS

JP  2008-77625  4/2008

OTHER PUBLICATIONS

Mayur Datar et al., "Locality-Sensitive Hashing Scheme Based on p-Stable Distributions," Proceedings of the twentieth annual symposium on Computational geometry, 2004, 10 pages.

Olivier Duchenne et al., "A Tensor-Based Algorithm for High-Order Graph Matching," Proceedings of the IEEE Conference on Computer Vision and Pattern Recognition, 2009, 8 pages.

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

A recognition device includes storage unit that stores information of a cluster to which a model feature point belongs; extracting unit that extracts a feature amount of a query feature point; generating unit that determines a first set of the query feature point including a reference point and a dependent point, and generates geometric information; clustering unit that clusters the query feature point; correcting unit that sets up the model feature point as a nearest candidate of the reference point, sets up the model feature point as a nearest candidate of the dependent point, determines whether or not the nearest candidate of the reference point is present, and corrects the model feature point; and similarity degree calculating unit that calculates a similarity degree of the first set and a second set and determines the second set nearest to the first set.

7 Claims, 17 Drawing Sheets

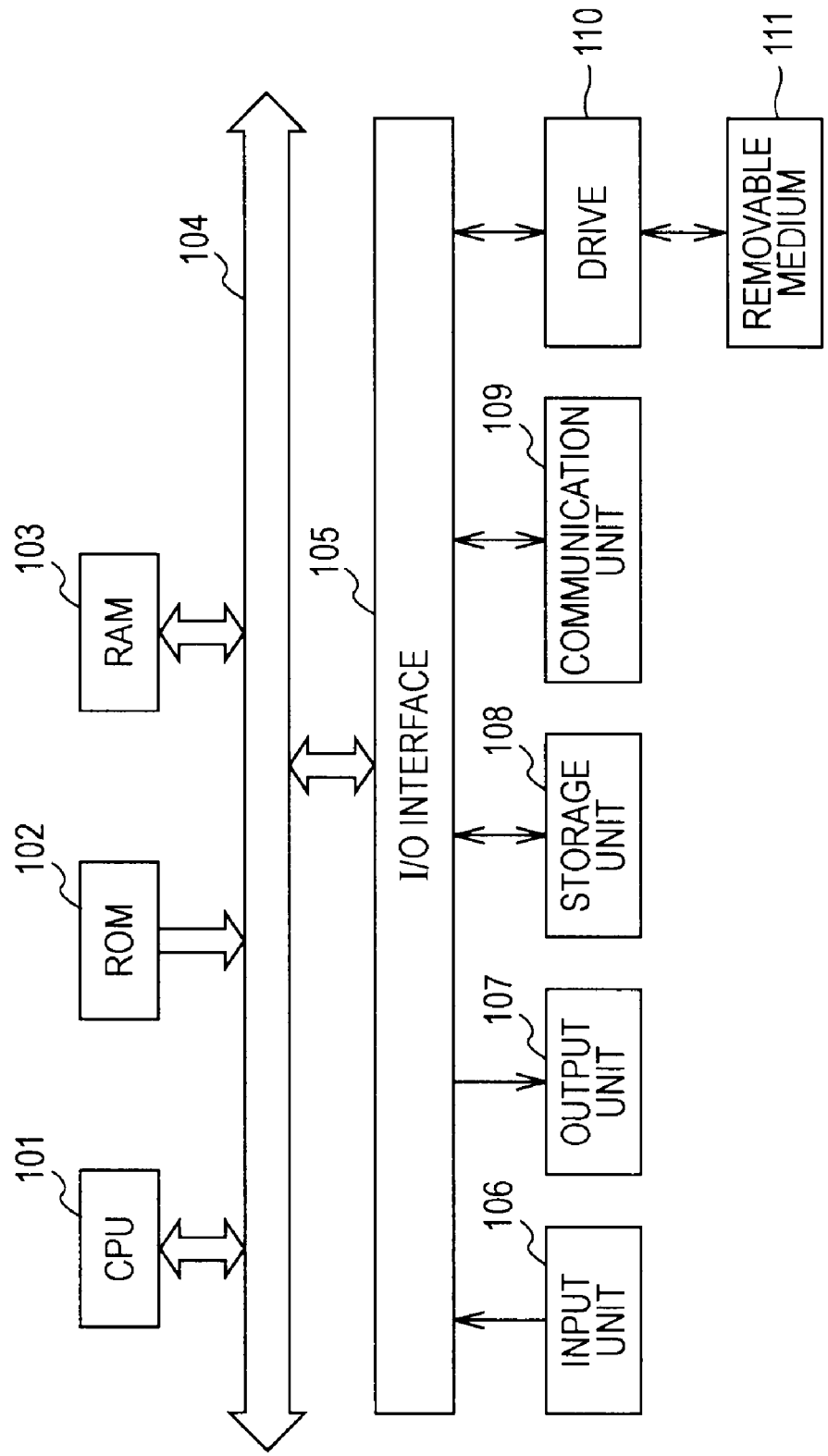

RECOGNITION DEVICE, RECOGNITION METHOD, AND PROGRAM

BACKGROUND OF THE INVENTION

1. Field of the Invention

The present invention relates to a recognition device, a recognition method, and a program, and more particularly, to a recognition device, a recognition method, and a program, which can rapidly perform the matching of a feature point set selected from a model image and a feature point set selected from a query image with each other.

2. Description of the Related Art

As a general object recognition scheme by using a local feature amount, Japanese Unexamined Patent Application Publication No. 2008-77625 discloses a scheme in which a plurality of feature point sets including a base point and a single or a plurality of support points, respectively, is extracted from the model image and the query image, and the matching of feature point sets with each other is performed.

For example, the base point of the model image is a feature point serving as a reference among feature points set up on the model image, and the support point is a feature point other than the base point and is determined in dependence to the base point. At the time of modeling, information representing a feature amount of each of the feature points and geometric information that is information representing a position of each support point, with a position of the base point given as a reference, are made to be stored.

According to the scheme (hereinafter, referred to as "scheme in the related art") disclosed in Japanese Unexamined Patent Application Publication No. 2008-77625, the recognition of an object of little texture may be robustly performed or the recognition may be performed, with an influence of a background being suppressed.

For a practical realization of the scheme in the related art, the speeding up of a calculation is necessary. For example, as a scheme of realizing the speeding up of the object recognition by using the local feature amount, there is a method of performing a database search represented by LSH (Locality Sensitive Hashing) disclosed in 'Locality-sensitive hashing scheme based on p-stable distributions', Mayur Datar, Piotr Indyk, Proceedings of the twentieth annual symposium on Computational geometry, pp. 253-262, 2004.

In the LSH, when a feature point of a query image is input, a cluster of model feature point, which is a subset to which the feature point belongs, is specified, and a similarity degree is calculated only with respect to the model feature point included in the same cluster. An amount of calculation is made to be small by decreasing the number of similarity degree calculations compared to a nearest search in which the similarity degree between all feature points is calculated, such that the recognition of an object may be rapidly performed.

A scheme in which the matching of the feature point in a feature point set unit is realized by using a hypergraph is disclosed in 'A Tensor-Based Algorithm for High-Order Graph Matching', Olivier Duchenne, Francis Bach, Inso Kweon, Jean Ponce, Proceedings of the IEEE Conference on Computer Vision and Pattern Recognition, 2009.

SUMMARY OF THE INVENTION

In a case where the LSH is applied to the scheme in the related art, since the feature point set includes a plurality of feature points, even when each nearest feature point is simply obtained by the LSH, it may not be the nearest set.

In addition, here, a scheme in which the above-described hypergraph is applied to the related art may be considered. In the scheme using the hypergraph, it is necessary to make the number of feature points making up the feature point set and the relative position thereof to be constant. Therefore, this scheme may not be applied to the matching of the feature point of the scheme in the related art where the number of feature points making up the feature point set is variable, and which has geometric information that flexibly regulates the relative position according to the position of the selected feature point.

Specifically, due to characteristics of an algorithm such things as an object is described by using a feature point set, and the number of feature points making up the feature point set is made to be varied for corresponding to the change of a shape of an object, the application of a scheme using the LSH or the hypergraph to the scheme in the related art may be difficult.

The invention has been made in consideration of such a circumstance, and it is desirable to rapidly perform the matching of a feature point set selected from a model image and a feature point set selected from a query image with each other.

According to an embodiment of the invention, there is provided a recognition device including: a storage unit that stores information of a cluster to which a model feature point that is a feature point of model data belongs, which is determined by clustering based on a feature amount and information of a feature amount of the model feature point; an extracting unit that extracts a feature amount of a query feature point that is a feature point of data input as a query; a generating unit that determines a first set of the query feature point including a reference point that is one of the query feature points, which serves as a reference and a dependent point that is one or a plurality of query feature points depending on the reference point, and generates, for each first set, geometric information that is information representing a position of each dependent point, with a position of the reference point given as a reference; a clustering unit that clusters the query feature point by the same scheme as in the clustering of the model feature point; a correcting unit that sets up the model feature point belonging to the same cluster as that of the reference point as a nearest candidate of the reference point, sets up the model feature point belonging to the same cluster as that of the dependent point as a nearest candidate of the dependent point, determines whether or not the nearest candidate of the reference point is present at a position where the reference point, which is specified by the geometric information, is regarded to be present, with a position of the nearest candidate of each dependent point given as a reference, and corrects the model feature point serving as the nearest candidate of the reference point according to a result of the determination; and a similarity degree calculating unit that calculates a similarity degree of the first set and a second set including the nearest candidate of the reference point after correcting and the nearest candidate of the dependent point based on a feature amount of each feature point and determines the second set nearest to the first set.

In a case where it is determined that the nearest candidate of the reference point is not present at a position where the nearest candidate of the reference point is regarded to be present, which is specified by the geometric information, the correcting unit may add the model feature point, which serves as the nearest candidate of the reference point, to the position.

In a case where it is determined that the nearest candidate of the reference point is not present at a position where the nearest candidate of the reference point is regarded to be present, which is specified by the geometric information, and the number of the nearest candidate of the dependent point depending on the model feature point at the position is greater than a predetermined number, the correcting unit may add the model feature point serving as the nearest candidate of the reference point.

In a case where it is determined that the nearest candidate of the reference point is present at a position where the reference point is regarded to be present, which is specified by the geometric information, and the number of the nearest candidate of the dependent point depending on the model feature point at the position is less than a predetermined number, the correcting unit may delete the nearest candidate of the reference point.

The recognition device may further include a quantization unit that quantizes the query feature amount vector to a value of either 1 or 0 in accordance with whether or not an inner product value of a query feature amount vector representing a feature amount of the query feature point and an LSH hash function vector that is a vector having the same dimension number as that of the query feature amount vector is equal to or greater than a threshold value, wherein the clustering unit clusters the query feature point as a feature point belonging to a cluster identified by a combination of a value after the quantization of the query feature amount vector, which is obtained by using each hash function vector.

According to another embodiment of the invention, there is provided a recognition method including the steps of storing information of a cluster to which a model feature point that is a feature point of model data belongs, which is determined by clustering based on a feature amount and information of a feature amount of the model feature point; extracting a feature amount of a query feature point that is a feature point of data input as a query; determining a first set of the query feature point including a reference point that is one of the query feature points, which serves as a reference and a dependent point that is one or a plurality of query feature points depending on the reference point, and generating, for each first set, geometric information that is information representing a position of each dependent point, with a position of the reference point given as a reference; clustering the query feature point by the same scheme as in the clustering of the model feature point; setting up the model feature point belonging to the same cluster as that of the reference point as a nearest candidate of the reference point, setting up the model feature point belonging to the same cluster as that of the dependent point as a nearest candidate of the dependent point, determining whether or not the nearest candidate of the reference point is present at a position where the reference point, which is specified by the geometric information, is regarded to be present, with a position of the nearest candidate of each dependent point given as a reference, and correcting the model feature point serving as the nearest candidate of the reference point according to a result of the determination; and calculating a similarity degree of the first set and a second set including the nearest candidate of the reference point after correcting and the nearest candidate of the dependent point based on a feature amount of each feature point and determining the second set nearest to the first set.

According to still another embodiment of the invention, there is provided a program allowing a computer to execute a process including the steps of storing information of a cluster to which a model feature point that is a feature point of model data belongs, which is determined by clustering based on a feature amount and information of a feature amount of the model feature point; extracting a feature amount of a query feature point that is a feature point of data input as a query; determining a first set of the query feature point including a reference point that is one of the query feature points, which serves as a reference and a dependent point that is one or a plurality of query feature points depending on the reference point, and generating, for each first set, geometric information that is information representing a position of each dependent point, with a position of the reference point given as a reference; clustering the query feature point by the same scheme as in the clustering of the model feature point; setting up the model feature point belonging to the same cluster as that of the reference point as a nearest candidate of the reference point, setting up the model feature point belonging to the same cluster as that of the dependent point as a nearest candidate of the dependent point, determining whether or not the nearest candidate of the reference point is present at a position where the reference point, which is specified by the geometric information, is regarded to be present, with a position of the nearest candidate of each dependent point given as a reference, and correcting the model feature point serving as the nearest candidate of the reference point according to a result of the determination; and calculating a similarity degree of the first set and a second set including the nearest candidate of the reference point after correcting and the nearest candidate of the dependent point based on a feature amount of each feature point and determining the second set nearest to the first set.

According to this embodiment of the invention, information of a cluster to which a model feature point that is a feature point of model data belongs, which is determined by clustering based on a feature amount and information of a feature amount of the model feature point are stored, and a feature amount of a query feature point that is a feature point of data input as a query is extracted. In addition, a first set of the query feature point including a reference point that is one of the query feature points, which serves as a reference and a dependent point that is one or a plurality of query feature points depending on the reference point is determined, geometric information that is information representing a position of each dependent point with a position of the reference point given as a reference is generated for each first set, and the query feature point is clustered by the same scheme as in the clustering of the model feature point. In addition, the model feature point belonging to the same cluster as that of the reference point is set as a nearest candidate of the reference point, the model feature point belonging to the same cluster as that of the dependent point is set as a nearest candidate of the dependent point, it is determined whether or not the nearest candidate of the reference point is present at a position where the reference point, which is specified by the geometric information, is regarded to be present, with a position of the nearest candidate of each dependent point given as a reference, and the model feature point serving as the nearest candidate of the reference point is corrected according to a result of the determination. A similarity degree of the first set and a second set including the nearest candidate of the reference point after correcting and the nearest candidate of the dependent point is calculated based on a feature amount of each feature point, and the second set nearest to the first set is determined.

According to the embodiments of the invention, it is possible to rapidly perform the matching of a feature point set selected from a model image and a feature point set selected from a query image with each other.

BRIEF DESCRIPTION OF THE DRAWINGS

FIG. 19 is a block diagram illustrating a configuration example of a computer.

DESCRIPTION OF THE PREFERRED EMBODIMENTS

Configuration Example of Learning Device

Figure 1:
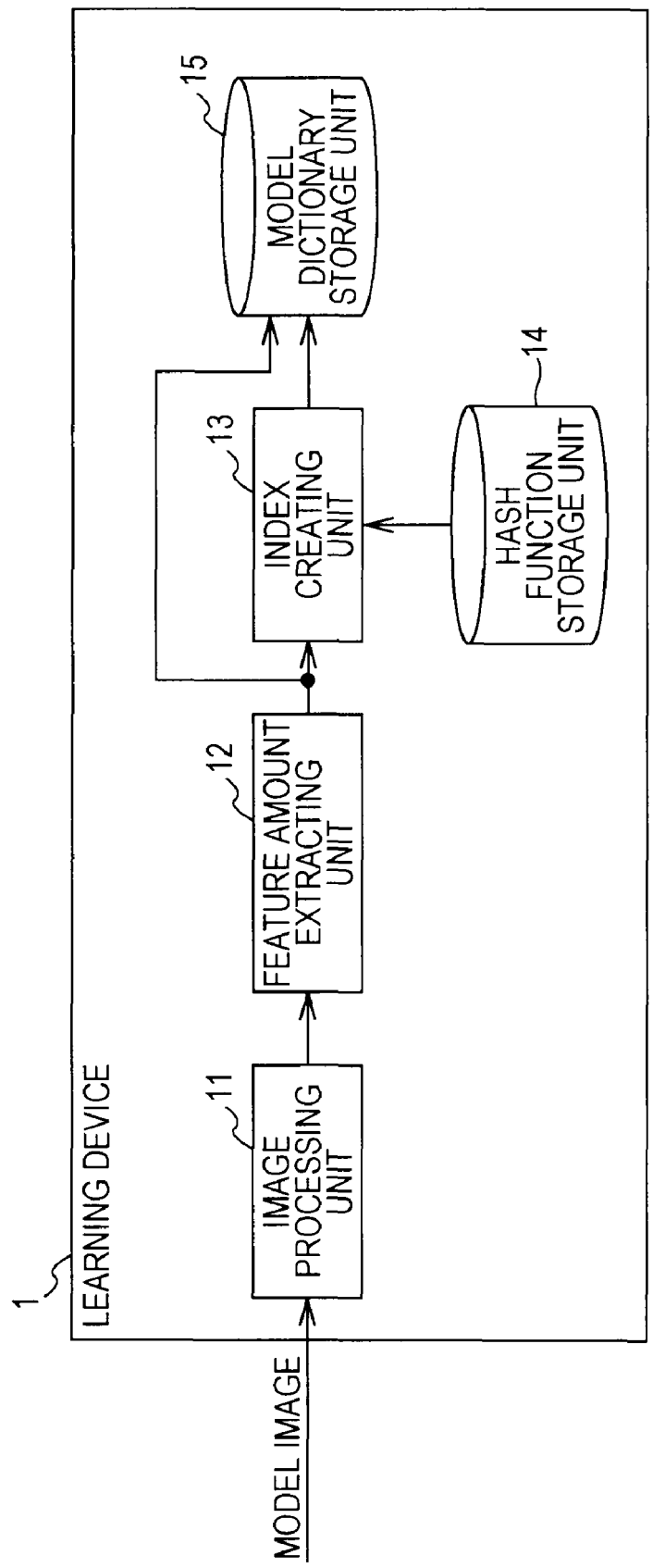
FIG. 1 is a block diagram illustrating a configuration example of a learning device according to an embodiment of the invention.

FIG. 1 shows a block diagram illustrating a configuration example of a learning device according to an embodiment of the invention.

A process, which performs the nearest search such as a KNN matching by an LSH, includes a learning process as an off-line phase and a recognition process as an on-line phase. A learning device 1 of FIG. 1 is a device performing a learning process.

The learning device 1 is configured by a computer. At least a part of function units shown in FIG. 1 is realized in a manner that a predetermined program is executed by a CPU of a computer making up the learning device 1.

As shown in FIG. 1, the learning device 1 includes an image processing unit 11, a feature amount extracting unit 12, an index creating unit 13, a hash function storage unit 14, and a model dictionary storage unit 15. A model image, which is an image of an object to be recognized, is input to the image processing unit 11.

The image processing unit 11 performs an initial process such as a process of converting a model image to a grayscale image, a process of generating an edge image based on a grayscale model image and a multi-resolution process. The image processing unit 11 output data of a model image, which is obtained by the initial process, to the feature amount extracting unit 12.

The feature amount extracting unit 12 determines each point on an edge of a model image as a feature point. For example, the feature amount extracting unit 12 extracts information of an image at a position corresponding to a feature point, which is included in each image having a different resolution obtained by the multi-resolution process, as a feature amount (local feature amount).

The feature amount extracting unit 12 stores information of a feature amount vector, which represents an extracted feature amount, in the model dictionary storage unit 15, and outputs it to the index creating unit 13.

Hereinafter, a feature point of a model image is referred to as "model feature point", and a feature amount vector representing a feature amount of a model feature point is referred to as "model feature amount vector".

The index creating unit 13 reads an LSH hash function stored in the hash function storage unit 14, and quantizes a model feature amount vector by using the read hash function. One feature amount vector is quantized to 0 or 1 by using one hash function.

In addition, the index creating unit 13 clusters a model feature point as a feature point belonging to a cluster where a combination of a quantization value which is obtained, respectively, by applying a plurality of hash functions to a model feature amount vector is set as a key.

The index creating unit 13 creates index information made to correlate each model feature point and a key that is identification information of a cluster to which a model feature point belongs and then stores the index information in the model dictionary storage unit 15. The quantization of the model feature point vector by the index creating unit 13 and the clustering will be described later.

The hash function storage unit 14 stores a plurality of LSH hash functions generated in advance. The generation of LSH hash function is described in 'Locality-sensitive hashing scheme based on p-stable distributions', Mayur Datar, Piotr Indyk, Proceedings of the twentieth annual symposium on Computational geometry, pp. 253-262, 2004.

The model dictionary storage unit 15 stores a model dictionary including the information of a model feature amount vector extracted by the feature amount extracting unit 12 and the index information created by the index creating unit 13. The model dictionary stored in the model dictionary storage unit 15 is supplied to a recognition device actually performing the recognition of an object. The supply of the model dictionary from the learning device 1 to the recognition device is performed via a wireless communication or a recording medium.

Figure 2:
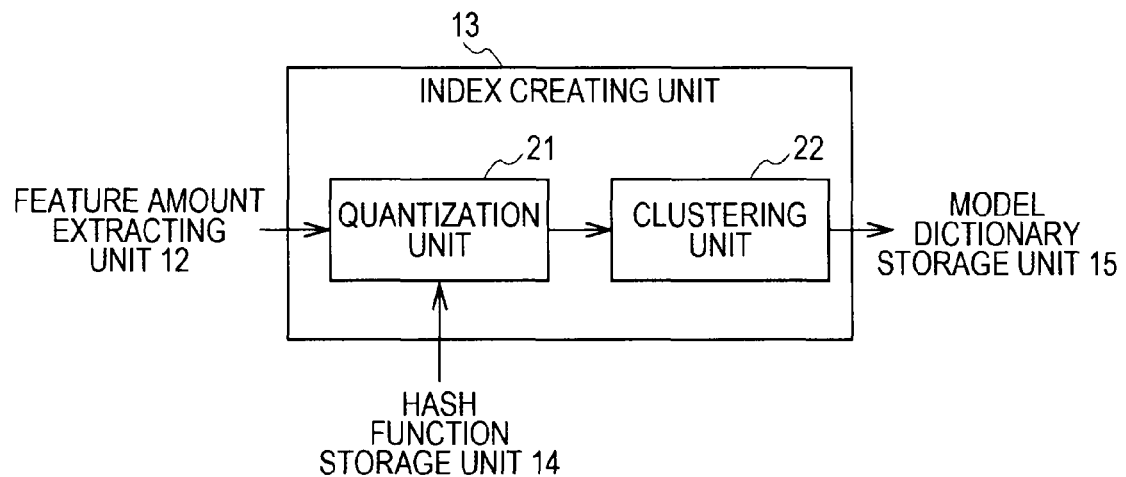
FIG. 2 is a block diagram illustrating a configuration example of an index creating unit of FIG. 1.

FIG. 2 shows a block diagram illustrating a configuration example of the index creating unit 13 of FIG. 1.

As shown in FIG. 2, the index creating unit 13 includes a quantization unit 21 and a clustering unit 22.

The quantization unit 21 calculates a hash value by applying the hash function stored in the hash function storage unit 14 to the model feature amount vector supplied from the feature amount extracting unit 12.

The hash function stored in the hash function storage unit 14 is represented by a vector (hash function vector) having the same dimension number as that of the model feature amount vector. The hash value calculated by the quantization unit 21 becomes a vector of real numbers and each term of the vector is an inner product of a model feature amount vector and a hash function vector.

The quantization unit 21 compares an inner product value calculated as a hash value and a threshold value and quantizes the model feature amount vector to a value of either 1 or 0. For example, the quantization unit 21 quantizes the model feature amount vector to a value of 1 when the inner product of the model feature amount vector and the hash function vector is equal to or greater than 0 as a threshold value, and quantizes the model feature amount vector to a value of 0 when the inner product is less than 0.

Figure 3:
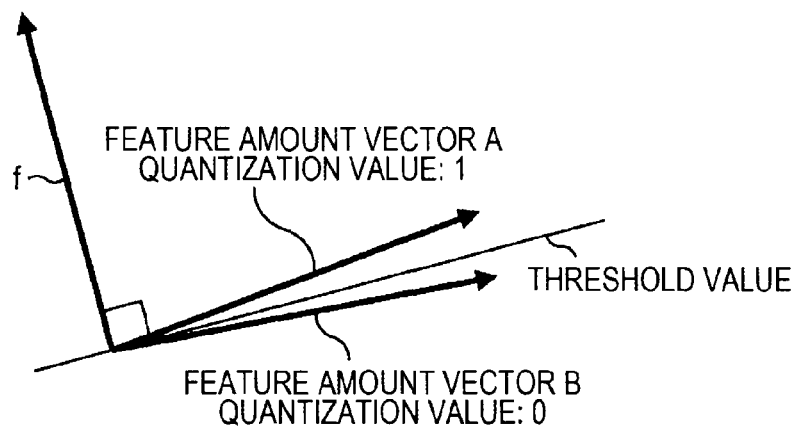
FIG. 3 is a view illustrating an example of the quantization of a model feature amount vector.

FIG. 3 shows a view illustrating the quantization of the model feature amount vector.

A feature amount vectors A and B of FIG. 3 are model feature amount vectors. A hash function vector f represents one hash function among a plurality of prepared functions. With respect to the hash function vector f, a hyperplane orthogonal to the hash function vector f is set as a threshold value dividing a feature amount space in two.

For example, when the inner product value of the feature amount vector A and the hash function vector f is obtained as a value equal to or greater than 0 that is a threshold value, the feature amount vector A is quantized to a value of 1.

In addition, when the inner product value of the feature amount vector B and the hash function vector f is obtained as a value of less than 0, the feature amount vector B is quantized to a value of 0.

The quantization unit 21 performs the quantization of the above-described model feature amount vector by using each hash function vector stored in the hash function storage unit 14. The quantization value obtained by the quantization unit 21 is supplied to the clustering unit 22.

The clustering unit 22 clusters each model feature point based on the quantization value obtained by the quantization unit 21.

Figure 4:
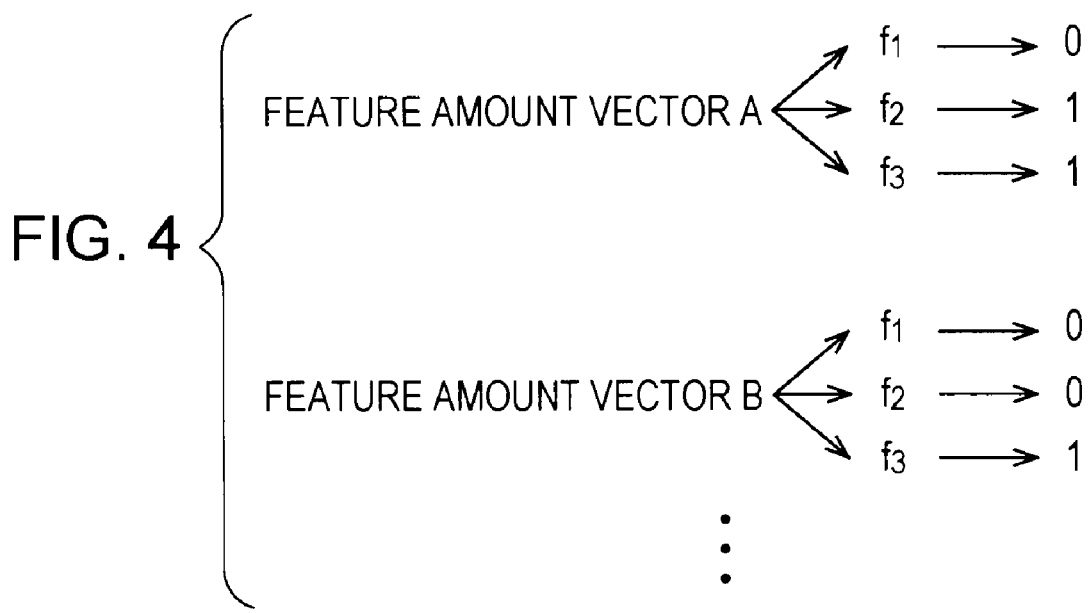
FIG. 4 is a view illustrating an example of a quantization value.

FIG. 4 shows a view illustrating an example of the quantization value of the model feature amount vector.

FIG. 4 shows an example of the quantization value of the feature amount vectors A and B that are model feature amount vectors obtained by using each of the hash function vectors $f_1$ to $f_3$.

In the example shown in FIG. 4, the feature amount vector A is quantized to a value of 0, when the hash function vector $f_1$ is used. The feature amount vector A is quantized to a value of 1, when the hash function vector $f_2$ is used. The feature amount vector A is quantized to a value of 1, when the hash function vector $f_3$ is used.

Similarly, the feature amount vector B is quantized to a value of 0 when the hash function vector $f_1$ is used. The feature amount vector B is quantized to a value of 0, when the hash function vector $f_2$ is used. The feature amount vector B is quantized to a value of 1, when the hash function vector $f_3$ is used.

In this case, the clustering unit 22 clusters the model feature point of which a feature amount is represented by the feature amount vector A, as a feature point belonging to a cluster where [0, 1, 1] that is a combination of a quantization value calculated by using each hash function vector is set as a key.

In addition, the clustering unit 22 clusters the model feature point of which a feature amount is represented by the feature amount vector B, as a feature point belonging to a cluster where [0, 0, 1] that is a combination of a quantization value calculated by using each hash function vector is set as a key.

The clustering unit 22 creates index information made to correlate an ID of a model feature point of which a feature amount is represented by the feature amount vector A and [0, 1, 1]. The clustering unit 22 creates index information made to correlate an ID of a model feature point of which a feature amount is represented by the feature amount vector B and [0, 0, 1].

As described above, in the index creating unit 13, with respect to each model feature amount vector, an inner product value of a model feature amount vector and a hash function vector is calculated, and then the calculated value is compared with a threshold value to quantize the model feature amount vector to either 1 or 0. In addition, the model feature point is clustered based on the quantization value.

As described above, the model dictionary generated by the learning device 1 is supplied to the recognition device and the recognition of an object is performed by using a local feature amount.

Configuration Example of Recognition Device

Figure 5:
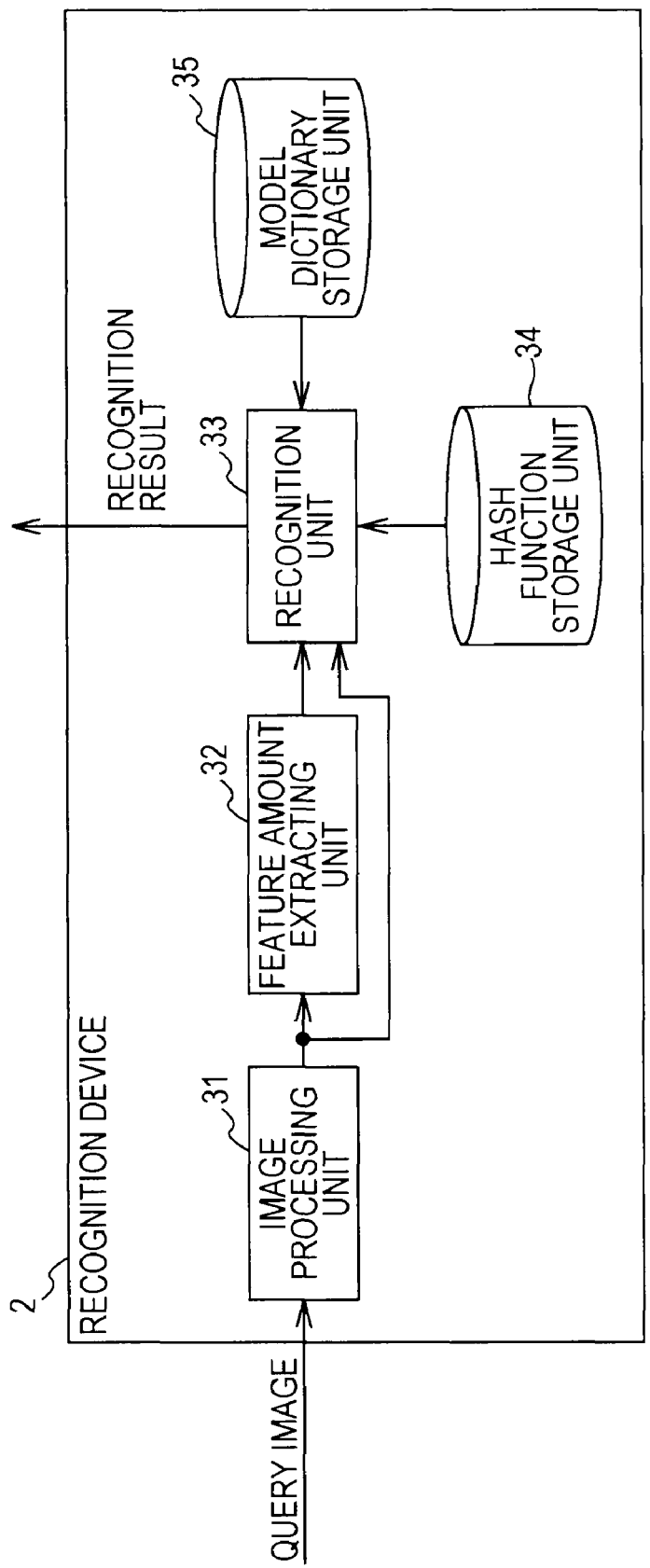
FIG. 5 is a block diagram illustrating a configuration example of a recognition device according to an example of the invention.

FIG. 5 shows a block diagram illustrating a configuration example of a recognition device according to an embodiment of the invention.

A recognition device 2 of FIG. 5 is a recognition device that performs the recognition of an object, which uses a local feature amount, by an LSH.

The recognition device 2 is also configured by a computer. At least a part of function units shown in FIG. 5 is realized in a manner that a predetermined program is executed by a CPU of a computer making up the recognition device 2. The learning device 1 and the recognition device 2 may be realized by the same computer or may be realized by a different computer, respectively.

As shown in FIG. 5, the recognition device 2 includes an image processing unit 31, a feature amount extracting unit 32, a recognition unit 33, a hash function storage unit 34, and a model dictionary storage unit 35. A query image is input to the image processing unit 31.

The image processing unit 31 performs substantially the same process as that of the image processing unit 11 of FIG. 1. Specifically, the image processing unit 31 performs an initial process based on the query image. The image processing unit 31 outputs data of the query image, which is obtained by performing the initial process, to the feature amount extracting unit 32 and the recognition unit 33.

The feature amount extracting unit 32 determines the feature point of the query image and extracts a feature amount of each feature point, similarly to the feature amount extracting unit 12 of FIG. 1.

Hereinafter, a feature point of a query image is appropriately referred to as "query feature point", and a feature amount vector representing a feature amount of a query feature point is referred to as "query feature amount vector".

The recognition unit 33 determines a plurality of feature point sets from the query image supplied from the image processing unit 31, each feature point set including a base point and a single or a plurality of support points, and performs the matching of the plurality of feature point sets with each other by an LSH.

The base point is a feature point serving as a reference among feature points set up on the query image, and the support point is a feature point other than the base point and is determined in dependence on the base point. The recognition unit 33 generates geometric information representing a position of each support point with a position of the base point given as a reference.

The recognition unit 33, for example, recognizes which model image an object included in the query image is an object included therein, based on the result of the matching of the feature point sets with each other, and outputs the recognition result. For example, the object is recognized based on the number of the nearest model feature point set, which is matched with the query feature point set, or the like.

The hash function storage unit 34 stores the same plurality of LSH hash functions as those stored in the hash function storage unit 14 of the learning device 1.

The model dictionary storage unit 35 stores the model dictionary supplied from the learning device 1.

Figure 6:
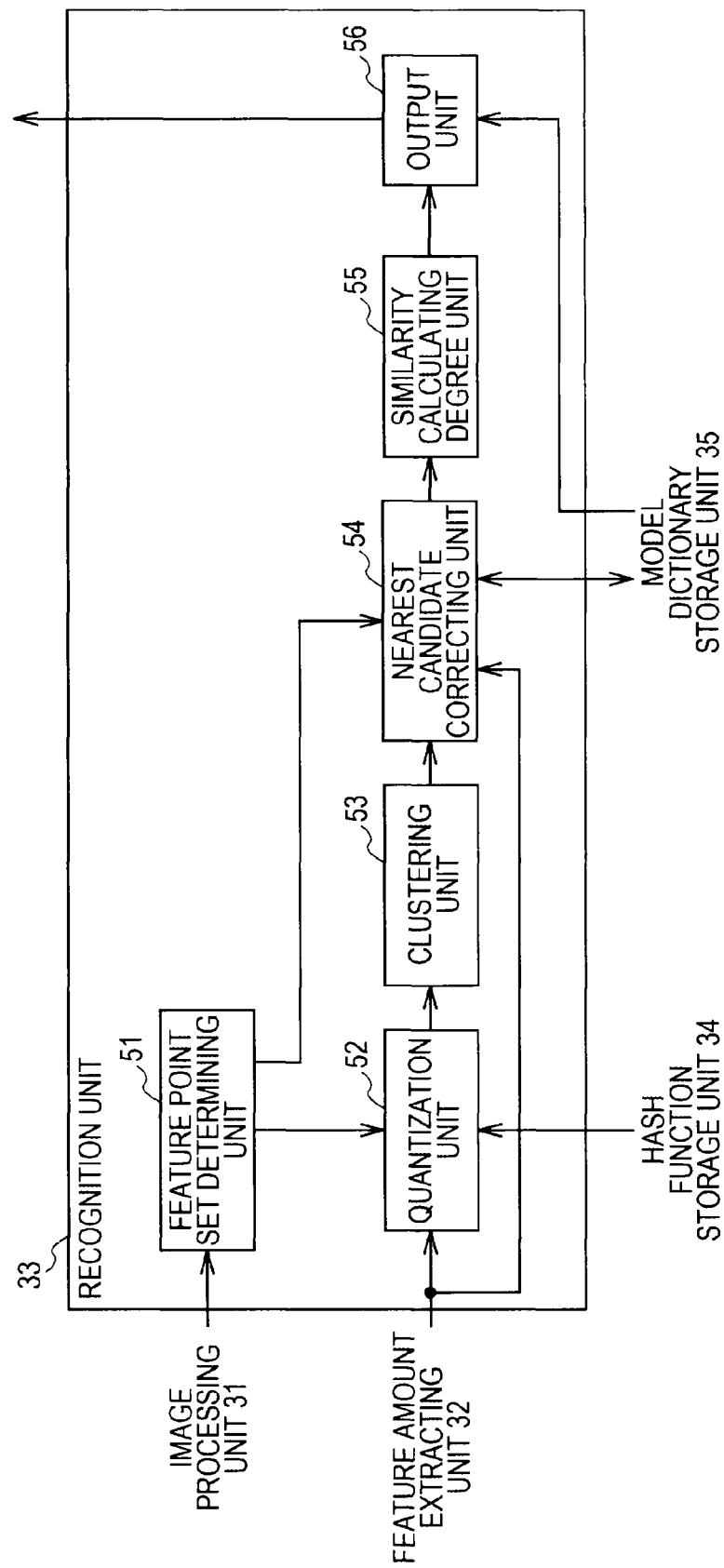
FIG. 6 is a block diagram illustrating a configuration example of a recognition unit of FIG. 5.

FIG. 6 show a block diagram illustrating a configuration example of the recognition unit 33 of FIG. 5.

As shown in FIG. 6, the recognition unit 33 includes a feature point set determining unit 51, a quantization unit 52, a clustering unit 53, a nearest candidate correcting unit 54, a similarity degree calculating unit 55, and an output unit 56. Data, which is obtained by performing an initial process with respect to a query image output from the image processing unit 31, is input to the feature point set determining unit 51.

The feature point set determining unit 51 determines a plurality of feature point sets based on the data of the query image supplied from the image processing unit 31, each feature point set including a base point and a single or a plurality of support points.

Figure 7:
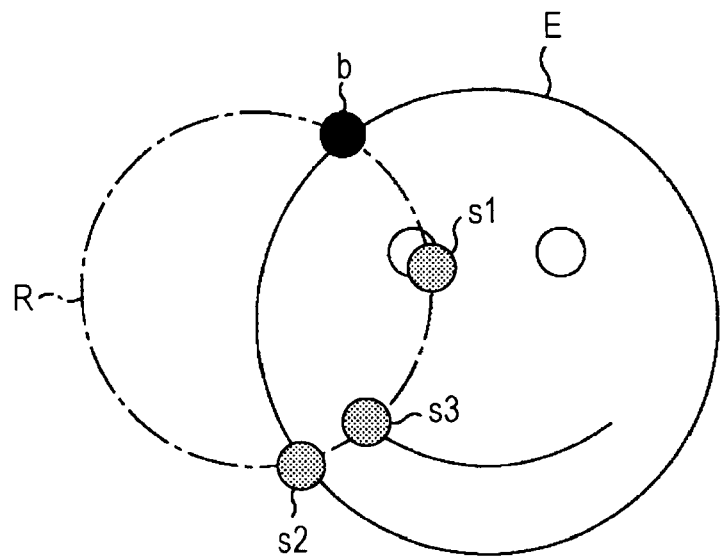
FIG. 7 is a view illustrating an example of the determination of a feature point.

FIG. 7 shows a view illustrating an example of the feature point set.

For example, as shown in FIG. 7, the feature point set determining unit 51 determines a reference circle R, and sets points on an edge image E intersecting with the reference circle R as a base point b and support points s1, s2, and s3. The edge image E of FIG. 7 is an image generated by the image processing unit 31 based on the query image. The feature point set determining unit 51 changes the size and the position of the reference circle R to determine a plurality of feature point sets that are query feature point sets including a base point and a support point, respectively. The number and the position relation of the query feature point making up each feature point set become different for each set according to the change of the position and the size of the reference circle R.

In addition, the feature point set determining unit 51 generates, for each feature point set, geometric information representing a position of each support point with the base point given as a reference.

Figure 8:
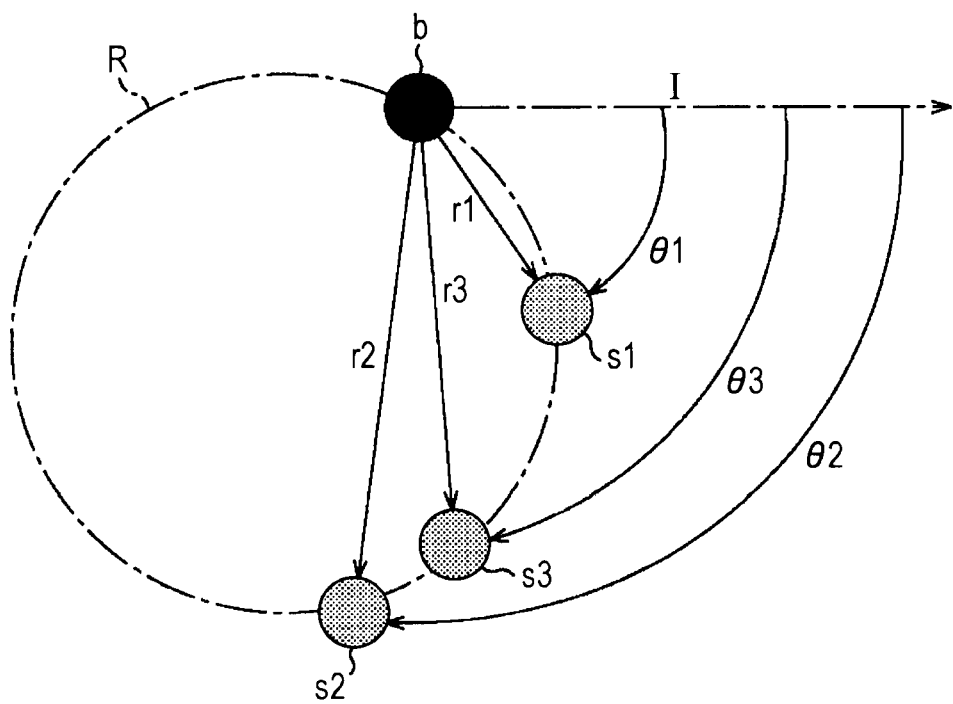
FIG. 8 is a view illustrating a positional relation between feature points.

FIG. 8 shows a view illustrating an example of information included in the geometric information.

As shown in FIG. 8, the relative position (distance and angle) of the support points s1 to s3 from the base point b are represented by relative distances r1, r2, and r3, and relative angles θ1, θ2, and θ3 from a reference axis I. The geometric information includes information represented by the relative distances r1, r2, and r3, and relative angles θ1, θ2, and θ3 from a reference axis I.

The feature point set determining unit 51 outputs the information of the query feature point making up the feature point set to the quantization unit 52. In addition, the feature point set determining unit 51 outputs the information of the query feature point making up the feature point set and the geometric information to the nearest candidate correcting unit 54. In addition, the method of determining the feature point set as described above is disclosed, for example, Japanese Unexamined Patent Application Publication Nos. 2008-77625 and 2008-243175.

The quantization unit 52 specifies the query feature point making up the feature point set based on the information supplied from the feature point set determining unit 51, and quantizes a query feature amount vector representing a characteristic of the specified query feature point similarly to the quantization unit 21 of FIG. 2. The information of the query feature amount vector, which is output from the feature amount extracting unit 32, is input to the quantization unit 52.

Specifically, the quantization unit 52 applies the hash function stored in the hash function storage unit 34 to the query feature amount vector to calculate a hash value.

The quantization unit 52 compares an inner product value calculated as a hash value and a threshold value and quantizes the query feature amount vector to a value of either 1 or 0. For example, the quantization unit 52 quantizes the query feature amount vector to a value of 1 when the inner product value of the query feature amount vector and the hash function vector is equal to or greater than 0 as a threshold value, and quantizes the query feature amount vector to a value of 0 when the inner product value is less than 0.

The quantization unit 52 performs the quantization of the query feature amount vector by using each hash function vector stored in the hash function storage unit 34. The quantization unit 52 outputs the quantization value obtained by using each hash function vector to the clustering unit 53.

The clustering unit 53 clusters each query feature point based on the quantization value obtained by the quantization unit 52, similarly to the clustering unit 22 of FIG. 2.

For example, in a case where the query feature amount vector is quantized to a value of 0, 1, 1, respectively, the clustering unit 53 clusters the query feature point of which the feature amount is represented by the query feature amount vector thereof, as a feature point belonging to a cluster where [0, 1, 1] is set as a key.

In addition, in a case where the query feature amount vector is quantized to a value of 0, 0, 1, respectively, the clustering unit 53 clusters the query feature point of which the feature amount is represented by the query feature amount vector thereof, as a feature point belonging to a cluster where [0, 0, 1] is set as a key.

The clustering unit 53 outputs the key information of a cluster to which the query feature point belongs, to the nearest candidate correcting unit 54.

The nearest candidate correcting unit 54 specifies a cluster to which the query feature point making up the feature point set belongs, based on the result of the clustering performed by the clustering unit 53. In addition, the nearest candidate correcting unit 54 sets a model feature point, which belongs to the same cluster as in the query feature point, as the feature point of the nearest candidate, and makes a correction on the model feature point of the nearest candidate. The correction made on the model feature point will be described later.

The nearest candidate correcting unit 54 outputs information of the feature amount vector of the query feature point making up each feature point set, that is supplied from the feature amount extracting unit 32 to the similarity degree calculating unit 55.

In addition, the nearest candidate correcting unit 54 reads out information of the feature amount vector of the model feature point of the nearest candidate from the model dictionary storage unit 35, and outputs it to the similarity degree calculating unit 55. The information output from the nearest candidate correcting unit 54 also includes the information of the feature amount vector of the model feature point of the nearest candidate, which is added by the correction.

The similarity degree calculating unit 55, for each feature point set, calculates a similarity degree of the feature point sets with each other, based on the similarity degree of the feature amount vector of the query feature point making up the feature point set and the feature amount vector of the model feature point of the nearest candidate specified by the nearest candidate correcting unit 54.

Specifically, the similarity degree calculating unit 55 calculates a similarity degree of the feature point set including the query feature point and the model feature point set including the nearest candidate of each query feature point, based on a similarity degree of the feature amount vector of the base point making up the feature point set and the feature amount vector of the model feature point serving as the nearest candidate of the base point, and a similarity degree of the feature amount vector of the support point making up the feature point set and the feature amount vector of the model feature point serving as the nearest candidate of the support point. For example, a value obtained by adding each similarity degree of the feature amount vector between the feature points is calculated as a similarity degree of the feature point set including the query feature point and the model feature point set including the nearest candidate.

The similarity degree calculating unit 55 selects a predetermined number of the model feature point set of the nearest candidate in order of similarity degree, and performs a generalization hough transform or an outlier removing process to select the nearest model feature point set. The similarity degree calculating unit 55 outputs the information of the nearest model feature point set to the output unit 56.

The output unit 56 recognizes which model image an object included in the query image is an object included therein, based on the number of the nearest model feature point sets or the like, and outputs the recognition result.

Correction of Model Feature Point

Description will be given with respect to the correction made on the model feature point of the nearest candidate, which is performed by the nearest candidate correcting unit 54, with reference to FIGS. 9 to 13.

Figure 9:
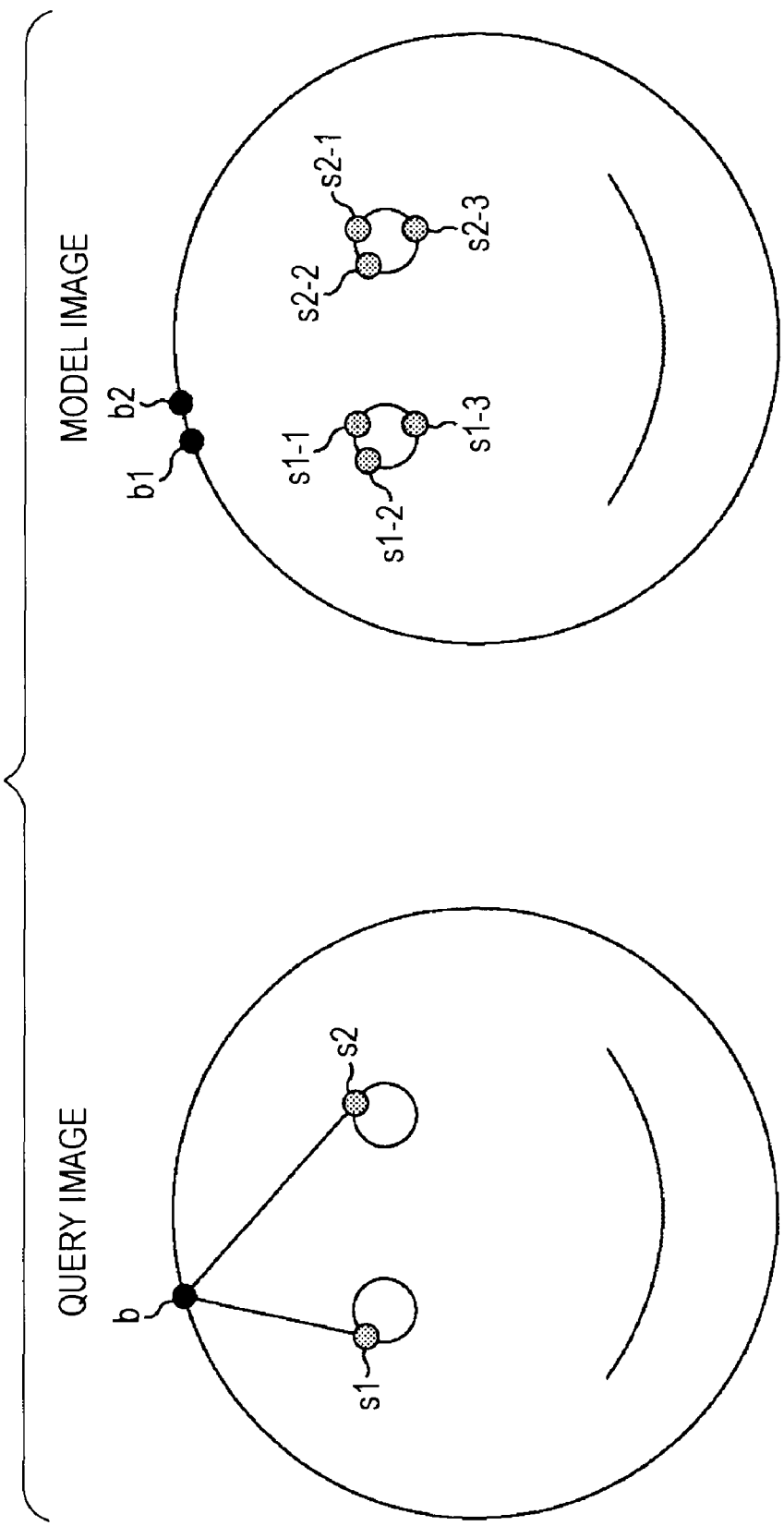
FIG. 9 is a view illustrating an example of a feature point.

FIG. 9 shows a view illustrating an example of a query feature point making up a feature point set and a model feature point serving as the nearest candidate of each query feature point.

In FIG. 9, a left side shows an example of the query feature point that is a feature point of a query image, and a right side shows an example of the model feature point that is a feature point of a model image. Description will be given with respect to a case where a process is performed to a feature point set including a base point b and support points s1 and s2 shown on the left side of FIG. 9.

The base point b and the support points s1 and s2 are determined by the feature point set determining unit 51. Geometric information, which is supplied from the feature point set determining unit 51, includes information representing a position of the support point s1 and information representing a position of the support point s2, with a position of the base point b given as a reference. Which cluster each query feature point of the base point b and the support points s1 and s2 belongs to is determined by the clustering unit 53.

In this case, the nearest candidate correcting unit 54 specifies a model feature point belonging to the same cluster as in the base point b based on the index information stored in the model dictionary storage unit 35 and sets the specified model feature point as the nearest candidate of the base point b.

In addition, the nearest candidate correcting unit 54 specifies a model feature point belonging to the same cluster as in the query feature point of each of the support points s1 and s2 based on the index information and sets the specified model feature point as the nearest candidate of each of the support points s1 and s2.

Model feature points b1 and b2 shown on the right side of FIG. 9 are the nearest candidates of the base point b. In addition, each of model feature points s1-1, s1-2, and s1-3 is the nearest candidate of the support point s1. Each of model feature points s2-1, s2-2 and s2-3 is the nearest candidate of the support point s2.

Hereinafter, the model feature point of the nearest candidate of the base point is referred to as "base point candidate", and the model feature point of the nearest candidate of the support point is referred to as "support point candidate".

The nearest candidate correcting unit 54 gives attention to each support point candidate and determines whether or not the base point candidate is present at a position where the base point specified by geometric information is regarded to be present, with a position of the support point candidate given as a reference.

Figure 10:
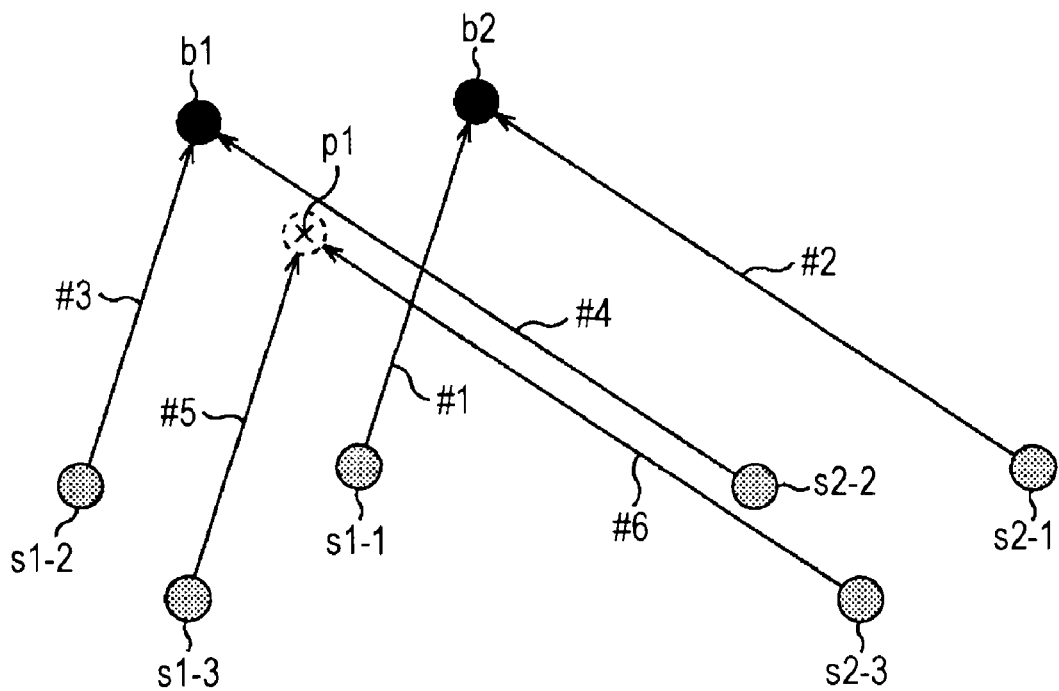
FIG. 10 is a view illustrating the correction of a feature point.

FIG. 10 shows a view illustrating the base point candidates and the support point candidates that are on the right side of FIG. 9.

First, the nearest candidate correcting unit 54, for example, gives attention to the support point candidate s1-1. The nearest candidate correcting unit 54 determines whether or not the base point candidate is present in front of an arrow #1 where the nearest candidate of the base point b is regarded to be present, with a position of the support point candidate s1-1 given as a reference.

In the example of FIG. 10, it is determined that the base point candidate b2 is present at that position. The position in front of an arrow #1 is specified based on a positional relationship between the base point b and the support point s1, which is represented by geometric information. At this point of time, the number of votes of the base point candidate b2 becomes 1.

In addition, the nearest candidate correcting unit 54 gives attention to the support point candidate s2-1. The nearest candidate correcting unit 54 determines whether or not the base point candidate is present in front of an arrow #2 where the nearest candidate of the base point b is regarded to be present, with a position of the support point candidate s2-1 given as a reference.

In the example of FIG. 10, it is determined that the base point candidate b2 is present at that position. The position in front of an arrow #2 is specified based on a positional relationship between the base point b and the support point s2, which is represented by geometric information. At this point of time, the number of votes of the base point candidate b2 becomes 2.

Similarly, the nearest candidate correcting unit 54 gives attention to the support point candidate s1-2. The nearest candidate correcting unit 54 determines whether or not the base point candidate is present in front of an arrow #3 where the nearest candidate of the base point b is regarded to be present, with a position of the support point candidate s1-2 given as a reference.

In the example of FIG. 10, it is determined that the base point candidate b1 is present at that position. The position in front of an arrow #3 is specified based on a positional relationship between the base point b and the support point s1, which is represented by geometric information. At this point of time, the number of votes of the base point candidate b1 becomes 1.

In addition, the nearest candidate correcting unit 54 gives attention to the support point candidate s2-2. The nearest candidate correcting unit 54 determines whether or not the base point candidate is present in front of an arrow #4 where the nearest candidate of the base point b is regarded to be present, with a position of the support point candidate s2-2 given as a reference.

In the example of FIG. 10, it is determined that the base point candidate b1 is present at that position. The position in front of an arrow #4 is specified based on a positional relationship between the base point b and the support point s2, which is represented by geometric information. At this point of time, the number of votes of the base point candidate b1 becomes 2.

The nearest candidate correcting unit 54 gives attention to the support point candidate s1-3. The nearest candidate correcting unit 54 determines whether or not the base point candidate is present at a position p1 in front of an arrow #5 where the nearest candidate of the base point b is regarded to be present, with a position of the support point candidate s1-3 given as a reference.

In the example of FIG. 10, it is determined that the base point candidate is not present at the position p1. A dotted circle indicates that the model feature point is not present. The position p1 in front of an arrow #5 is specified based on a positional relationship between the base point b and the support point s1, which is represented by geometric information. At this point of time, the number of votes of the position p1 becomes 1.

In addition, the nearest candidate correcting unit 54 gives attention to the support point candidate s2-3. The nearest candidate correcting unit 54 determines whether or not the base point candidate is present at a position p1 in front of an arrow #6 where the nearest candidate of the base point b is regarded to be present, with a position of the support point candidate s2-3 given as a reference.

In the example of FIG. 10, it is determined that the base point candidate is not present at the position p1. The position p1 in front of an arrow #6 is specified based on a positional relationship between the base point b and the support point s2, which is represented by geometric information. At this point of time, the number of votes of the position p1 becomes 2.

Figure 11:
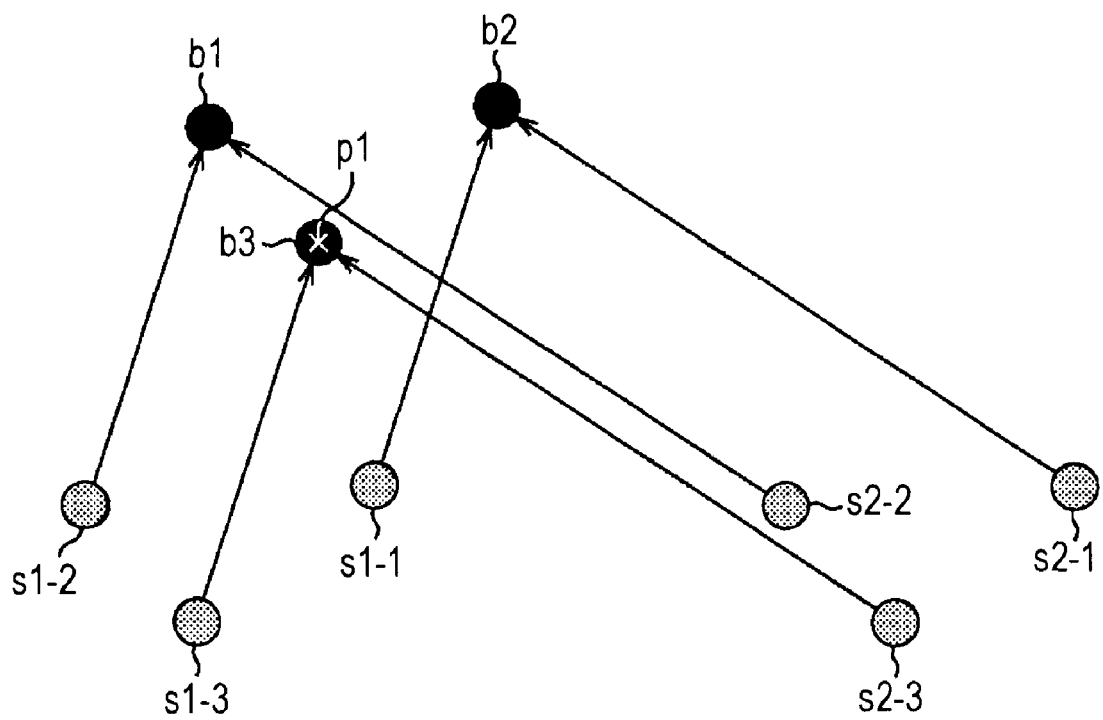
FIG. 11 is a view illustrating the correction of a feature point, which is continuous from FIG. 10.

In this case, as shown in FIG. 11, the nearest candidate correcting unit 54 adds a base candidate b3 that is the nearest candidate of the base point b to a position p1 where the nearest candidate of the base point is regarded to be present with a position of the support point candidate s1-3 given as a reference and where the nearest candidate of the base point is regarded to be present with a position of the support point candidate s2-3 given as a reference.

Specifically, in a case where a base point candidate is not present at a position where the base point candidate is regarded to be present, which is specified by geometric information, the nearest candidate correcting unit 54 adds a model feature point serving as a candidate to that position. In a case where the number of votes are equal to or greater than a predetermined number (in a case where the number of a support point candidate of which a base point is regarded to be present at the same position is equal to or greater than a predetermined number), a model feature point serving as a base point may be added.

The nearest candidate correcting unit 54 updates the index information stored in the model dictionary storage unit 35 and additionally registers the newly added base point candidate b3 as a model feature point belonging to the same cluster as in the base point b and the base point candidates b1 and b2.

In addition, the nearest candidate correcting unit 54 stores information of a model feature amount vector of the base point candidate b3 in the model dictionary storage unit 35. The model feature amount vector representing a feature amount of the base point candidate b3, for example, may be obtained by a prediction based on a model feature amount vector of other base point candidates.

Figure 12:
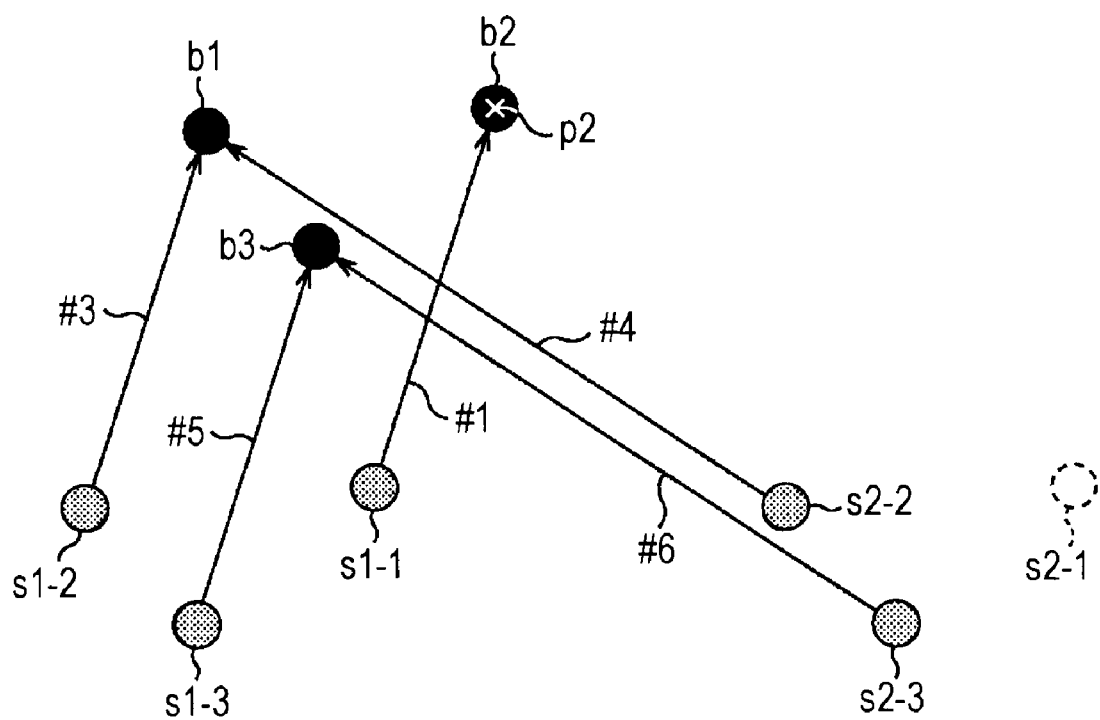
FIG. 12 is a view illustrating another correction of a feature point.

FIG. 12 shows a view illustrating another example of the base point candidate and the support point candidate.

In an example of FIG. 12, it is assumed that base point candidates b1, b2, and b3 are present as the nearest candidate of the base point b and support point candidates s1-1, s1-2, and s1-3 are present as the nearest candidate of the support point candidate s1.

In addition, it is assumed that support point candidates s2-2 and s2-3 are present as the nearest candidate of the support point s2. In the example of FIG. 12, the support point candidate s2-1 of FIG. 10 as the nearest candidate of the support point candidate s2 is not present, as shown as a dotted circle.

Description will be given with respect to the correction of the nearest candidate in such a state.

The nearest candidate correcting unit 54, for example, gives attention to the support point candidate s1-1. The nearest candidate correcting unit 54 determines whether or not the base point candidate is present at a position p2 in front of an arrow #1 where the nearest candidate of the base point b is regarded to be present, with a position of the support point candidate s1-1 given as a reference.

In the example of FIG. 12, it is determined that the base point candidate b2 is present at the position p2. At this point of time, the number of votes of the position p2 of the base point candidate b2 becomes 1.

In addition, the nearest candidate correcting unit 54 gives attention to the support point candidate s1-2. The nearest candidate correcting unit 54 determines whether or not the base point candidate is present at a position in front of an arrow #3 where the nearest candidate of the base point b is regarded to be present, with a position of the support point candidate s1-2 given as a reference.

In the example of FIG. 12, it is determined that the base point candidate b1 is present at that position. At this point of time, the number of votes of the base point candidate b1 becomes 1.

In addition, the nearest candidate correcting unit 54 gives attention to the support point candidate s2-2. The nearest candidate correcting unit 54 determines whether or not the base point candidate is present at a position in front of an arrow #4 where the nearest candidate of the base point b is regarded to be present, with a position of the support point candidate s2-2 given as a reference.

In the example of FIG. 12, it is determined that the base point candidate b1 is present at that position. At this point of time, the number of votes of the base point candidate b1 becomes 2.

In addition, the nearest candidate correcting unit 54 gives attention to the support point candidate s1-3. The nearest candidate correcting unit 54 determines whether or not the base point candidate is present at a position in front of an arrow #5 where the nearest candidate of the base point b is regarded to be present, with a position of the support point candidate s1-3 given as a reference.

In the example of FIG. 12, it is determined that the base point candidate b3 is present at that position. At this point of time, the number of votes of the base point candidate b3 becomes 1.

In addition, the nearest candidate correcting unit 54 gives attention to the support point candidate s2-3. The nearest candidate correcting unit 54 determines whether or not the base point candidate is present at a position in front of an arrow #6 where the nearest candidate of the base point b is regarded to be present, with a position of the support point candidate s2-3 given as a reference.

In the example of FIG. 12, it is determined that the base point candidate b3 is present at that position. At this point of time, the number of votes of the base point candidate b3 becomes 2.

Figure 13:
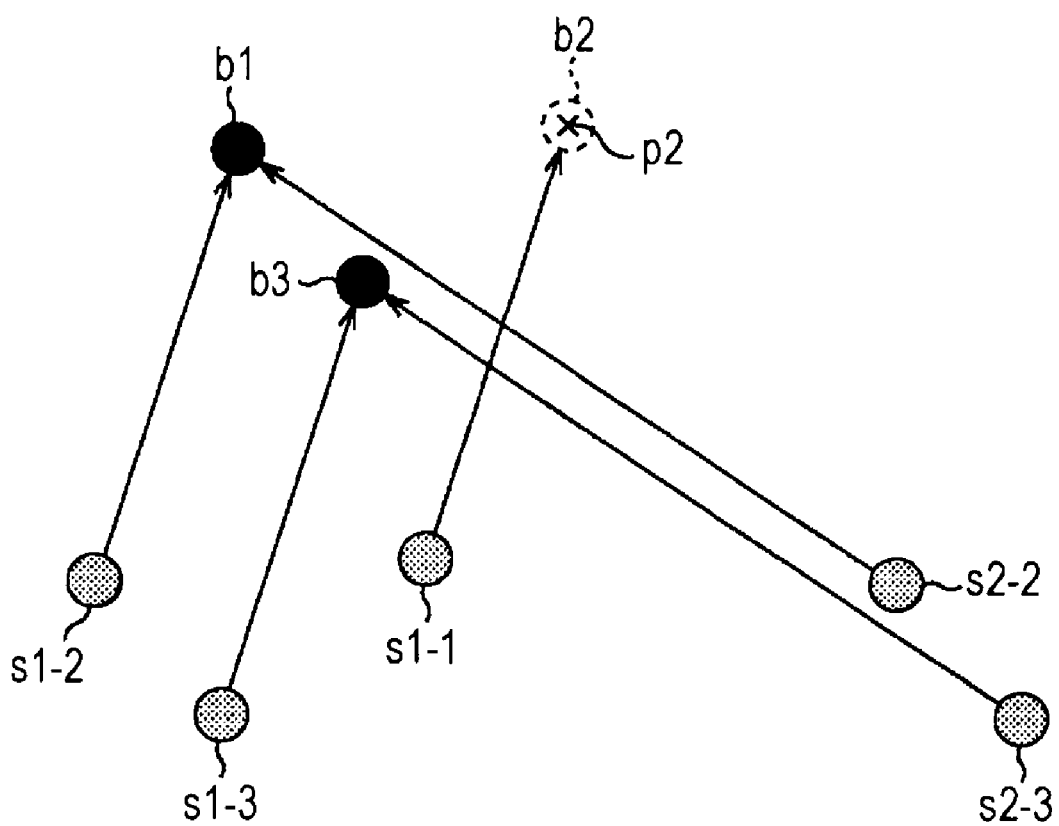
FIG. 13 is a view illustrating another correction of a feature point, which is continuous from FIG. 12.

In this case, as shown in FIG. 13, the nearest candidate correcting unit 54 deletes the base point candidate b2 present at the position p2 where the nearest candidate of the base point is regarded to be present with a position of the support point candidate s1-1 given as a reference and where the nearest candidate of the base point is regarded not to be present with a position of another support point candidate given as a reference.

Specifically, in a case where the base point candidate is actually present at a position where the base point candidate is regarded to be present, which is specified by geometric information, but the number of support point candidate of which base point candidate is regarded to be present at that position is smaller than a predetermined number (in a case where the number of votes is small), the nearest candidate correcting unit 54 deletes the base point candidate.

The nearest candidate correcting unit 54 updates the index information stored in the model dictionary storage unit 35 and deletes the base point candidate b2 from the same cluster as in the base point b and the base candidates b1 and b3.

In a case where each feature point is clustered by an LSH, a model feature point nearest to a base point may not be included in the same cluster as in a query feature point of the base point due to the quantization error of the feature amount vector. The model feature point of the base point candidate is added as described above, such that the model feature point excluded from the same cluster as in the query feature point of the base point can be included as a base point candidate.

In addition, due to the quantization error of the feature amount vector, a model feature point not nearest to a base point may be included in the same cluster as in a query feature point of the base point. The model feature point of the base point is deleted as described above, such that the model feature point erroneously included in the same cluster as in the query feature point of the base point can be deleted from the base point candidate.

Therefore, even when the LSH is adopted, it is possible to maintain the matching accuracy comparable with a complete nearest search that actually calculates the similarity between all the feature points.

Operation of Device

Here, the learning process of the learning device 1 will be described with reference a flow chart of FIG. 14.

Figure 14:
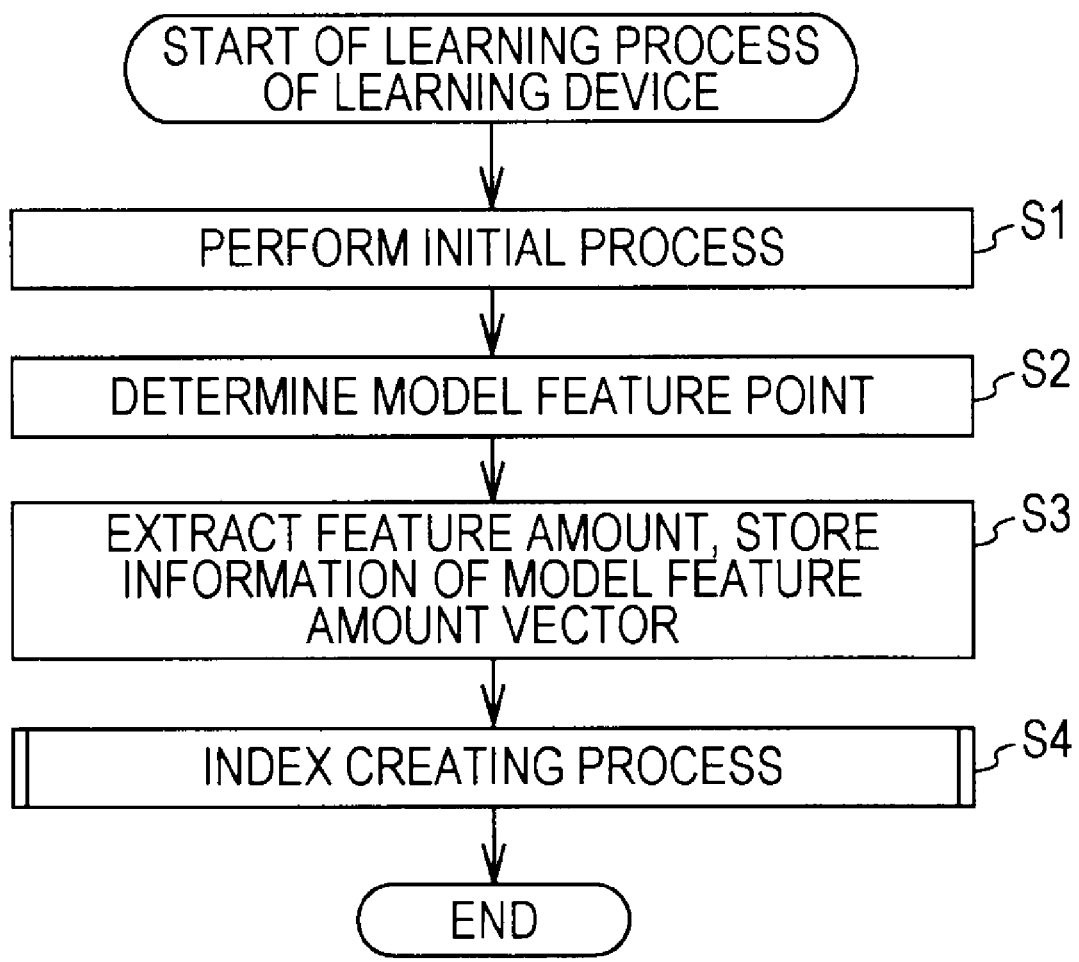
FIG. 14 is a flow chart illustrating a learning process of a learning device.

The process of FIG. 14 begins when a model image is input to the learning device 1.

In step S1, the image processing unit 11 performs an initial process.

In step S2, the feature amount extracting unit 12 determines each point of an edge image obtained by the initial process as a model feature point.

In step S3, the feature amount extracting unit 12 extracts a feature amount of each model feature point and stores information of a model feature amount vector, which represents the extracted feature amount, in the model dictionary storage unit 15.

In step S4, the index creating unit 13 performs an index creating process. In the index creating process, the model feature amount vector is quantized and the model feature point is clustered based on the quantization value. Then, the process is terminated.

Next, description will be given with respect to the index creating process performed in the step S4 of FIG. 14 with reference to a flow chart of FIG. 15.

Figure 15:
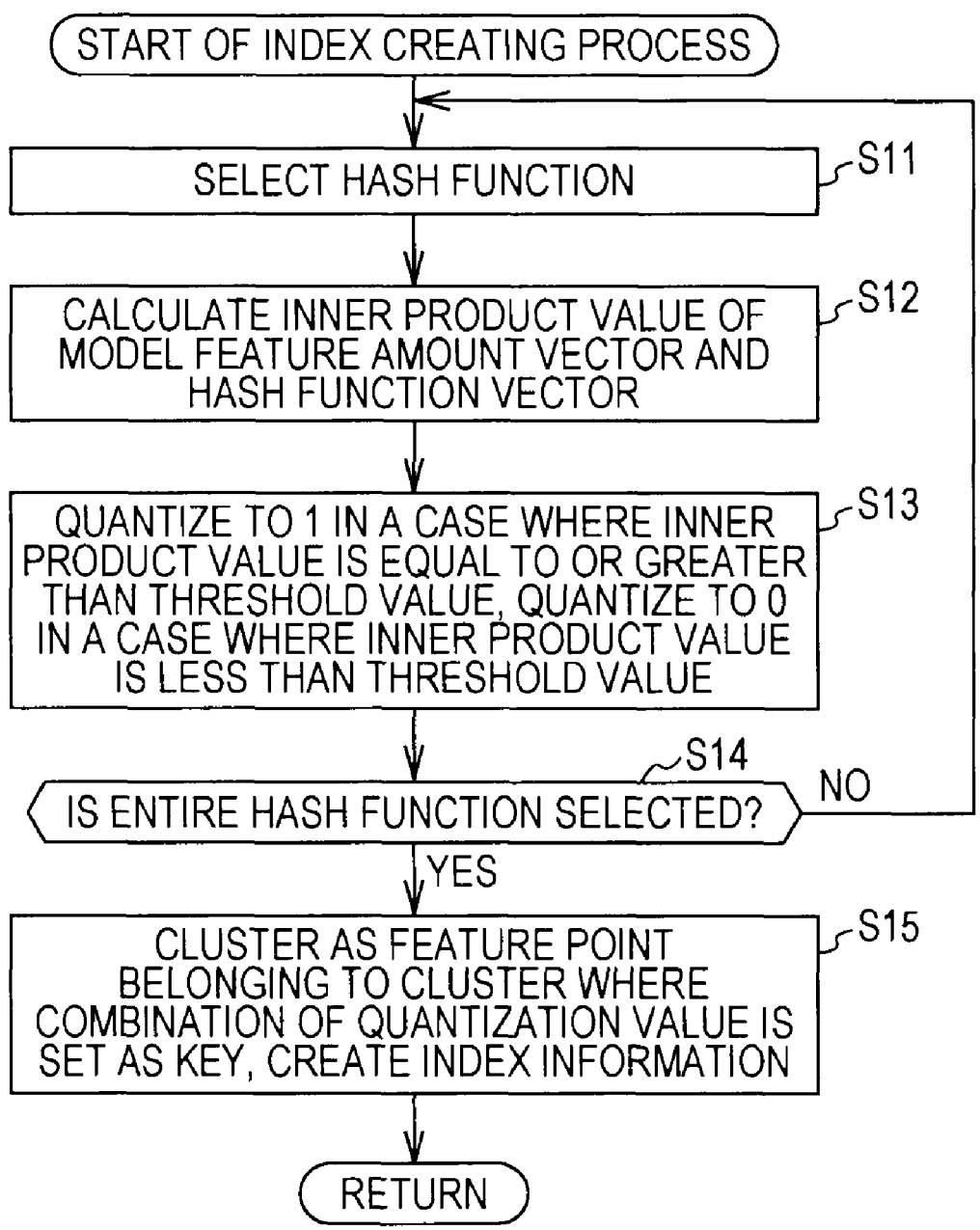
FIG. 15 is a flow chart illustrating an index creating process performed in step S4 of FIG. 14.

The process of FIG. 15 is performed whenever the information of the model feature amount vector representing the feature amount of one model feature point is supplied from the feature amount extracting unit 12.

In step S11, the quantization unit 21 selects one hash function stored in the hash function storage unit 14.

In step S12, the quantization unit 21 calculates an inner product value of the model feature amount vector and the selected hash function vector.

In step S13, the quantization unit 21 quantizes the model feature amount vector value to a value of 1 when the calculated inner product value is equal to or greater than 0 as a threshold value and quantizes the model feature amount vector value to a value of 0 when the calculated inner product value is less than 0.

In step S14, the quantization unit 21 determines whether or not all the hash functions stored in the hash function storage unit 14 are selected. When it is determined that the hash function still not selected is present in step S14, the process returns to step S11 and the quantization unit 21 selects a different hash function to repeat the above-described process.

On the other hand, when it is determined that all the hash functions are selected in step S14, in step S15, the clustering unit 22 clusters the model feature point as a feature point belonging to a cluster where a combination of the quantization value is set to key. In addition, the clustering unit 22 creates index information made to correlate the model feature point ID and the key and stores the index information in the model dictionary storage unit 15.

The above-described process is performed for all model feature points extracted by the feature amount extracting unit 12 as an object to be processed. Then, the process returns to step S4 of FIG. 14 and a process thereafter is performed.

Next, description will be given with respect to the recognition process of the recognition device 2 with reference to a flow chart of FIG. 16.

Figure 16:
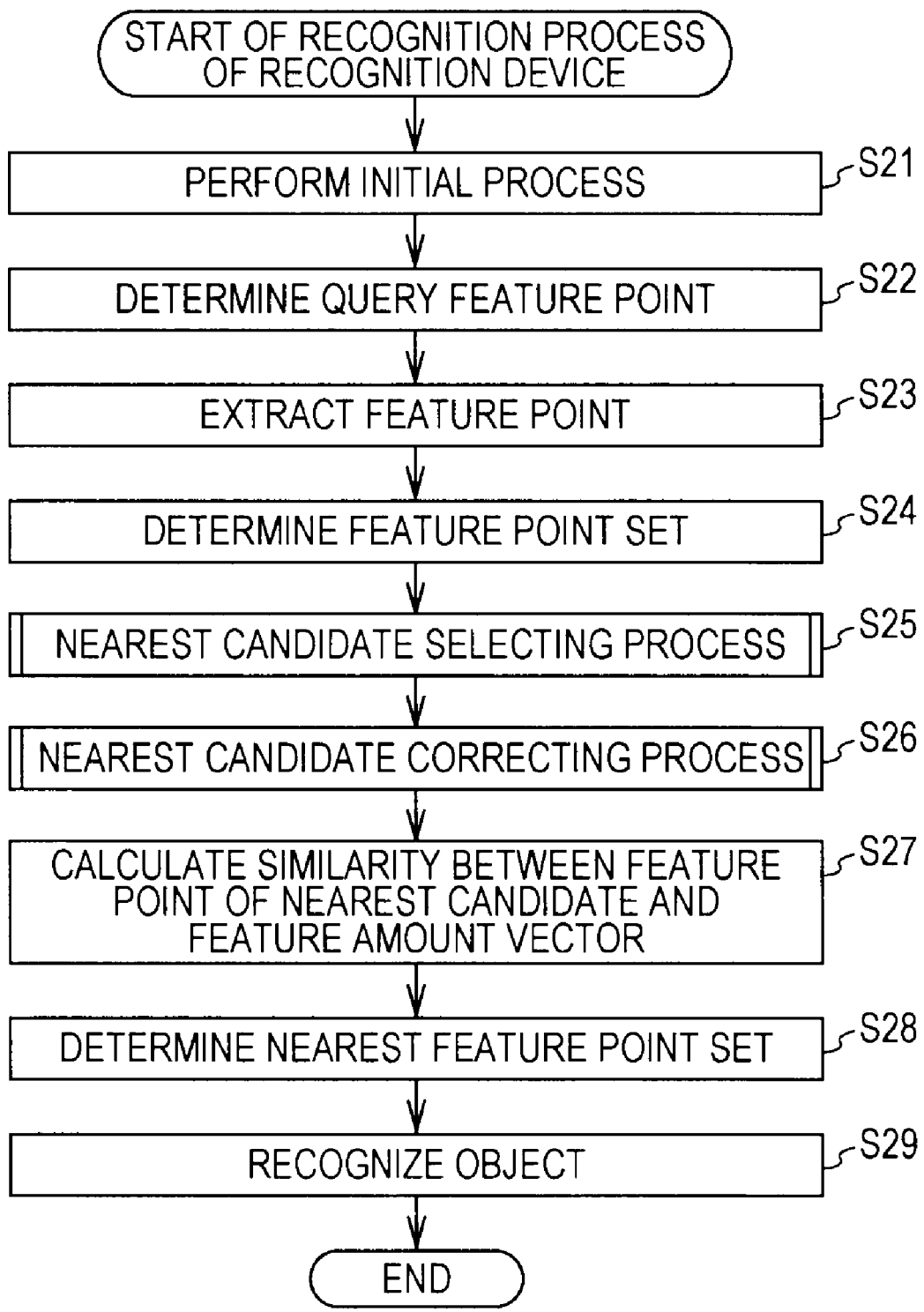
FIG. 16 is a flow chart illustrating a recognition process of a recognition unit.

The process of FIG. 16 begins when a query image is input to the recognition device 2.

In step S21, the image processing unit 31 performs an initial process.

In step S22, the feature amount extracting unit 32 determines each point of an edge image obtained by the initial process as a query feature point.

In step S23, the feature amount extracting unit 32 extracts a feature amount of each query feature point and outputs information of a query feature amount vector, which represents the extracted feature amount.

In step S24, as described with reference to FIG. 7, the feature point set determining unit 51 of the recognition unit 33 determines a plurality of feature point sets, each feature point set including a base point and a single or a plurality of support points. In addition, the feature point set determining unit 51 generates, for each feature point set, geometric information representing a position of each support point with a position of the base point given as a reference.

In step S25, the nearest candidate selecting process is performed by the quantization unit 52 and the clustering unit 53. In the nearest candidate selecting process, the query feature amount vector is quantized, and the query feature point is clustered.

In step S26, the nearest candidate correcting process is performed by the nearest candidate correcting unit 54. In the nearest candidate correcting process, the addition or deletion of the model feature point serving as the nearest candidate is performed.

In step S27, the similarity degree calculating unit 55 calculates, for each feature point set, a similarity degree between the feature points with each other, based on a similarity degree of the feature amount vector of the query feature point making up the feature point set and the feature amount vector of the model feature point of the nearest candidate.

In step S28, the similarity degree calculating unit 55 selects a predetermined number of the model feature point sets of the nearest candidate in order of similarity degree and selects the nearest model feature point set among them. The feature point set having the highest similarity degree may be selected as the nearest model feature point set.

In step S29, the output unit 56 recognizes which model image an object included in the query image is an object included therein, based on the number of the nearest model feature point set or the like, and outputs the recognition result. Then, the process is terminated.

Next, description will be given with respect to the nearest candidate selecting process performed in step S26 of FIG. 16 with reference to a flow chart if FIG. 17.

Figure 17:
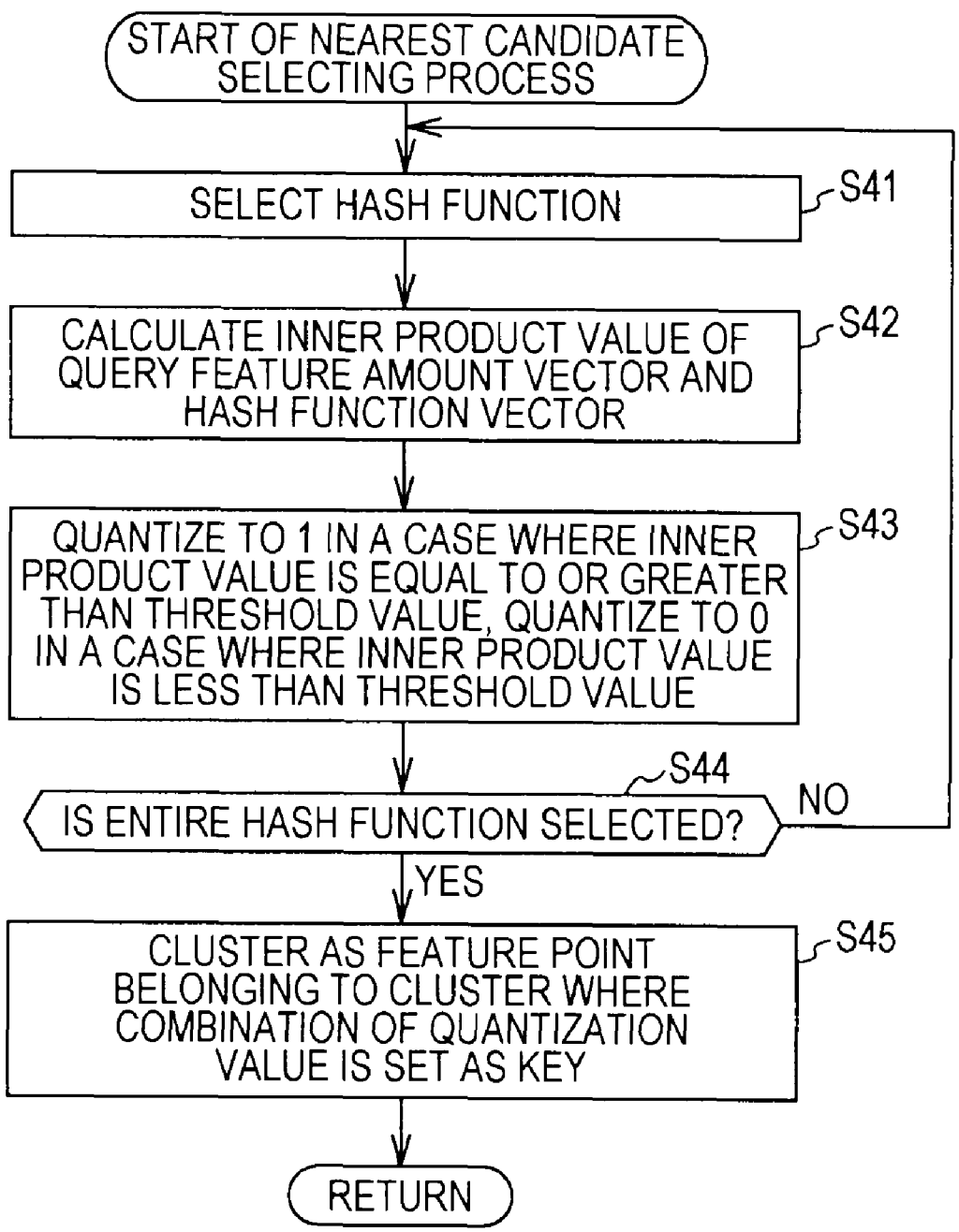
FIG. 17 is a flow chart illustrating the nearest candidate selecting process performed in step S25 of FIG. 16.

The process of FIG. 17 is performed whenever information of the query feature amount vector representing a feature amount of one query feature point is supplied from the feature amount extracting unit 32.

In step S41, the quantization unit 52 of the recognition unit 33 selects a hash function stored in the hash function storage unit 34.

In step S42, the quantization unit 52 calculates an inner product value of the query feature amount vector and the selected hash function vector.

In step S43, the quantization unit 52 quantizes the query feature amount vector value to a value of 1 when the calculated inner product value is equal to or greater than 0 as a threshold value and quantizes the query feature amount vector value to a value of 0 when the calculated inner product value is less than 0.

In step S44, the quantization unit 52 determines whether or not all the hash functions stored in the hash function storage unit 34 are selected. When it is determined that the hash function still not selected is present in step S44, the process returns to step S41 and the quantization unit 52 selects a different hash function to repeat the above-described process.

On the other hand, when it is determined that all the hash functions are selected in step S44, in step S45, the clustering unit 53 clusters the query feature point as a feature point belonging to a cluster where a combination of the quantization value is set as a key.

The above-described process is performed for all model feature points extracted by the feature amount extracting unit 32 as an object to be processed. Then, the process returns to step S25 of FIG. 16 and a process thereafter is performed.

Next, description will be given with respect to the nearest candidate correcting process performed in step S26 of FIG. 16 with reference to a flow chart of FIG. 18.

Figure 18:
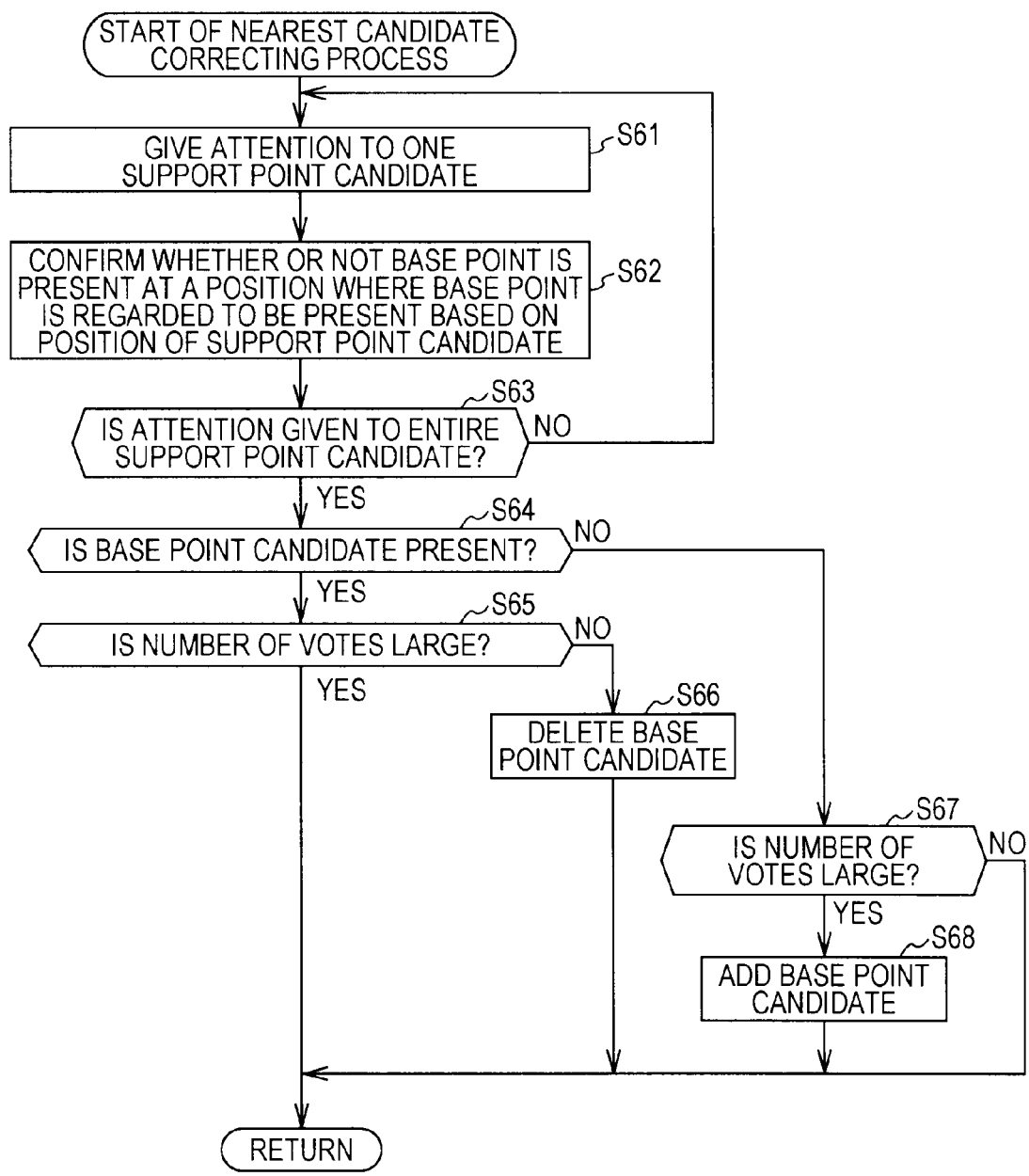
FIG. 18 is a flow chart illustrating the nearest candidate correcting process performed in step S26 of FIG. 16.

The process of FIG. 18 is performed for each feature point set determined by the feature point set determining unit 51 as an object to be processed.

In step S61, the nearest candidate correcting unit 54 gives attention to one support point candidate among support point candidates that are the nearest candidate of the support point making up the feature point set of an object to be processed.

In step S62, it is confirmed whether or not a base point candidate is present at a position where the base point specified by geometric information is regarded to be present, with a position of the support point to which attention is being given as a reference, by the nearest candidate correcting unit 54. When the base point candidate is present at the confirmed position, the nearest candidate correcting unit 54 adds the number of votes to that position by one.

In step S63, the nearest candidate correcting unit 54 determines whether or not the attention is given to all support point candidates.

In a case where it is determined that the attention is not given to all the support point candidates in step S63, the process returns to step S61, and the attention is given to another support point candidate and the above-described process is repeated.

On the other hand, in a case where it is determined that the attention is given to all the support point candidates in step S63, in step S64, the nearest candidate correcting unit 54 determines that the base point candidate is actually present at the confirmed position.

In a case where it is determined that the base point candidate is actually present in step S64, in step S65, the nearest candidate correcting unit 54 determines whether or not the number of votes is greater than a predetermined number.

In a case where it is determined that the number of votes is less than a predetermined number in step S65, in step S66, the nearest candidate correcting unit 54 deletes the base point candidate present at the confirmed position. In a case where the model feature point of the base point candidate is deleted or it is determined that the number of votes is greater than a predetermined number in step S65, the process returns to step S26 of FIG. 16 and processes thereafter are performed.

On the other hand, in a case where it is determined that the base point candidate is not present at the confirmed position in step S64, in step S67, the nearest candidate correcting unit 54 determines whether or not the number of votes is greater than a predetermined number.

In a case where it is determined that the number of votes is greater than a predetermined number in step S67, in step S68, the nearest candidate correcting unit 54 adds the model feature point serving as the base point candidate to the confirmed position. In a case where the model feature point serving as the base point candidate is added, or it is determined that the number of votes is less than a predetermined number in step S67, the process returns to step S26 of FIG. 16 and processes thereafter are performed.

Due to a series of processes described above, the recognition of an object is performed by the LSH, such that a calculation amount is reduced and the speeding up of the matching can be realized. In addition, accuracy in the matching can be maintained.

Configuration Example of Computer

A series of processes described above may be executed by either hardware or software. In a case where a series of processes are executed by software, the software may be installed in a computer constructed by embedding dedicated hardware or a general purpose personal computer from a program recording medium.

FIG. 19 show a block diagram illustrating a configuration example of hardware of a computer executing a series of processes described above by a program.

A CPU (Central Processing Unit) 101, a ROM (Read Only Memory) 102, and a RAM (Random Access Memory) 103 connect to each other via a bus 104.

The bus 104 further connects to an I/O (input/output) interface 105. The I/O interface 105 connects to an input unit 106 such as a keyboard and a mouse, and an output unit 107 such as a display and a speaker. In addition, the I/O interface 105 connects to a storage unit 108 such as a hard disk and a nonvolatile memory, a communication unit 109 such as a network interface, and a drive 110 that drives a removable medium 111.

In the computer constructed as described above, the CPU 101 loads a program stored, for example, in the storage unit 108 into the RAM 103 via the I/O interface 105 and the bus 104 to execute the program, and thereby the series of processes described above are performed.

The program that is executed by the CPU 101 may be provided by being recorded, for example, on the removable medium 111 or by being transmitted via a wire or wireless transmitting medium such as a local area network, the Internet, or digital broadcasting to be installed in the storage unit 108.

In addition, the program that is executed by the computer may be a program performing the processes along the sequence described in the specification in time-series or in parallel, or may be a program performing the processes at a necessary timing such as when a calling is made.

The present application contains subject matter related to that disclosed in Japanese Priority Patent Application JP 2010-088461 filed in the Japan Patent Office on Apr. 7, 2010, the entire contents of which are hereby incorporated by reference.

An embodiment of the invention is not limited to the above-described embodiments and various changes may be made without departing the scope of the invention.

What is claimed is:

1. A recognition device comprising:
a storage unit that stores information of a cluster to which a model feature point that is a feature point of model data belongs, which is determined by clustering based on a feature amount and information of a feature amount of the model feature point;
an extracting unit that extracts a feature amount of a query feature point that is a feature point of data input as a query;
a generating units that determines a first set of the query feature point including a reference point that is one of the query feature points, which serves as a reference and a dependent point that is one or a plurality of query feature points depending on the reference point, and generates, for each first set, geometric information that is information representing a position of each dependent point, with a position of the reference point given as a reference;
a clustering unit that clusters the query feature point by the same scheme as in the clustering of the model feature point;
a correcting unit that sets up the model feature point belonging to the same cluster as that of the reference point as a nearest candidate of the reference point, sets up the model feature point belonging to the same cluster as that of the dependent point as a nearest candidate of the dependent point, determines whether or not the nearest candidate of the reference point is present at a position where the reference point, which is specified by the geometric information, is regarded to be present, with a position of the nearest candidate of each dependent point given as a reference, and corrects the model feature point serving as the nearest candidate of the reference point according to a result of the determination; and
a similarity degree calculating unit that calculates a similarity degree of the first set and a second set including the nearest candidate of the reference point after correcting and the nearest candidate of the dependent point based on a feature amount of each feature point and determines the second set nearest to the first set.

2. The recognition device according to claim 1, wherein in a case where it is determined that the nearest candidate of the reference point is not present at a position where the nearest candidate of the reference point is regarded to be present, which is specified by the geometric information, the correcting unit adds the model feature point, which serves as the nearest candidate of the reference point, to the position.

3. The recognition device according to claim 2, wherein in a case where it is determined that the nearest candidate of the reference point is not present at a position where the nearest candidate of the reference point is regarded to be present, which is specified by the geometric information, and the number of the nearest candidate of the dependent point depending on the model feature point at the position is greater than a predetermined number, the correcting unit adds the model feature point serving as the nearest candidate of the reference point.

4. The recognition device according to claim 3, wherein in a case where it is determined that the nearest candidate of the reference point is present at a position where the reference point is regarded to be present, which is specified by the geometric information, and the number of the nearest candidate of the dependent point depending on the model feature point at the position is less than a predetermined number, the correcting unit deletes the nearest candidate of the reference point.

5. The recognition device according to claim 1, further comprising:
a quantization unit that quantizes the query feature amount vector to a value of either 1 or 0 in accordance with whether or not an inner product value of a query feature amount vector representing a feature amount of the query feature point and an LSH hash function vector that is a vector having the same dimension number as that of the query feature amount vector is equal to or greater than a threshold value,
wherein the clustering unit clusters the query feature point as a feature point belonging to a cluster identified by a combination of a value after the quantization of the query feature amount vector, which is obtained by using each hash function vector.

6. A recognition method comprising the steps of:
storing information of a cluster to which a model feature point that is a feature point of model data belongs, which is determined by clustering based on a feature amount and information of a feature amount of the model feature point;
extracting a feature amount of a query feature point that is a feature point of data input as a query;
determining a first set of the query feature point including a reference point that is one of the query feature points, which serves as a reference and a dependent point that is one or a plurality of query feature points depending on the reference point, and generating, for each first set, geometric information that is information representing a position of each dependent point, with a position of the reference point given as a reference;
clustering the query feature point by the same scheme as in the clustering of the model feature point;
setting up the model feature point belonging to the same cluster as that of the reference point as a nearest candidate of the reference point, setting up the model feature point belonging to the same cluster as that of the dependent point as a nearest candidate of the dependent point, determining whether or not the nearest candidate of the reference point is present at a position where the reference point, which is specified by the geometric information, is regarded to be present, with a position of the nearest candidate of each dependent point given as a reference, and correcting the model feature point serving as the nearest candidate of the reference point according to a result of the determination; and
calculating a similarity degree of the first set and a second set including the nearest candidate of the reference point after correcting and the nearest candidate of the dependent point based on a feature amount of each feature point and determining the second set nearest to the first set.

7. A non-transitory computer readable storage medium storing a computer executable instructions to perform the following:

storing information of a cluster to which a model feature point that is a feature point of model data belongs, which is determined by clustering based on a feature amount and information of a feature amount of the model feature point;

extracting a feature amount of a query feature point that is a feature point of data input as a query;

determining a first set of the query feature points including a reference point that is one of the query feature points, which serves as a reference and a dependent point that is one or a plurality of query feature points depending on the reference point, and generating, for each first set, geometric information that is information representing a position of each dependent point, with a position of the reference point given as a reference;

clustering the query feature point by the same scheme as in the clustering of the model feature point;

setting up the model feature point belonging to the same cluster as that of the reference point as a nearest candidate of the reference point, setting up the model feature point belonging to the same cluster as that of the dependent point as a nearest candidate of the dependent point, determining whether or not the nearest candidate of the reference point is present at a position where the reference point, which is specified by the geometric information, is regarded to be present, with a position of the nearest candidate of each dependent point given as a reference, and correcting the model feature point serving as the nearest candidate of the reference point according to a result of the determination; and calculating a similarity degree of the first set and a second set including the nearest candidate of the reference point after correcting and the nearest candidate of the dependent point based on a feature amount of each feature point and determining the second set nearest to the first set.

\* \* \* \* \*